(12) United States Patent
Sakuma et al.

(10) Patent No.: US 9,325,211 B2
(45) Date of Patent: Apr. 26, 2016

(54) WAVE WINDING COIL FOR ROTARY ELECTRICAL MACHINE

(71) Applicant: AISIN SEIKI KABUSHIKI KAISHA, Kariya (JP)

(72) Inventors: Masafumi Sakuma, Chiryu (JP); Tomohiro Fukushima, Obu (JP); Shuhei Yamashita, Nagoya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 557 days.

(21) Appl. No.: 13/716,989

(22) Filed: Dec. 17, 2012

(65) Prior Publication Data

US 2013/0154428 A1   Jun. 20, 2013

(30) Foreign Application Priority Data

Dec. 19, 2011   (JP) .................. 2011-276884

(51) Int. Cl.
*H02K 3/28* (2006.01)
(52) U.S. Cl.
CPC .............. *H02K 3/28* (2013.01); *H02K 2213/03* (2013.01)
(58) Field of Classification Search
USPC ................................................ 310/179–210
See application file for complete search history.

(56) References Cited

U.S. PATENT DOCUMENTS

| | | | | |
|---|---|---|---|---|
| 5,731,645 A | * | 3/1998 | Clifton et al. | 310/74 |
| 6,140,735 A | * | 10/2000 | Kato et al. | 310/201 |
| 6,995,492 B1 | | 2/2006 | Kouda et al. | |
| 2009/0276997 A1 | | 11/2009 | Akimoto et al. | |
| 2010/0141078 A1 | | 6/2010 | Kouda et al. | |
| 2010/0148620 A1 | | 6/2010 | Ishizuka et al. | |
| 2012/0007462 A1 | | 1/2012 | Kouda et al. | |

FOREIGN PATENT DOCUMENTS

| | | |
|---|---|---|
| EP | 2 124 317 A1 | 11/2009 |
| FR | 2842364 A1 | 1/2004 |
| JP | 2002-171705 A | 6/2002 |
| JP | 2004-48941 A | 2/2004 |
| JP | 2006-280158 A | 10/2006 |

(Continued)

OTHER PUBLICATIONS

Japanese Office Action issued Oct. 27, 2015, by the Japan Patent Office, in corresponding Japanese Patent Application No. 2011-276884 and English translation of Office Action (6 pages).

(Continued)

*Primary Examiner* — Naishadh Desai
(74) *Attorney, Agent, or Firm* — Buchanan Ingersoll & Rooney PC

(57) ABSTRACT

A wave winding coil for a rotary electrical machine includes a coil conductor including coil side portions and coil end portions, the coil conductor being wound to include a wave winding configuration, a relational expression expressing a total number of the coil side portions included in a phase coil is expressed by a mathematical expression 1 m×k=n×q×2p, and m refers to the number of the phase unit coils that are parallelly connected to each other, k refers to the number of the coil side portions that are serially connected to each other, q refers to the number of serially-connected-conductors per magnetic pole, the serially-connected-conductor belongs to one of the kinds of the coil side portions, 2p refers to the number of the magnetic pole, m refers to a common divisor between q×2p and n.

5 Claims, 11 Drawing Sheets

(56) References Cited

FOREIGN PATENT DOCUMENTS

| | | |
|---|---|---|
| JP | 3952346 B2 | 8/2007 |
| JP | 2009-303335 A | 12/2009 |
| JP | 2010-119295 A | 5/2010 |

OTHER PUBLICATIONS

European Search Report issued Jan. 29, 2016, by the European Patent Office, in corresponding European Patent Application No. 12198107 (8 pages).

* cited by examiner

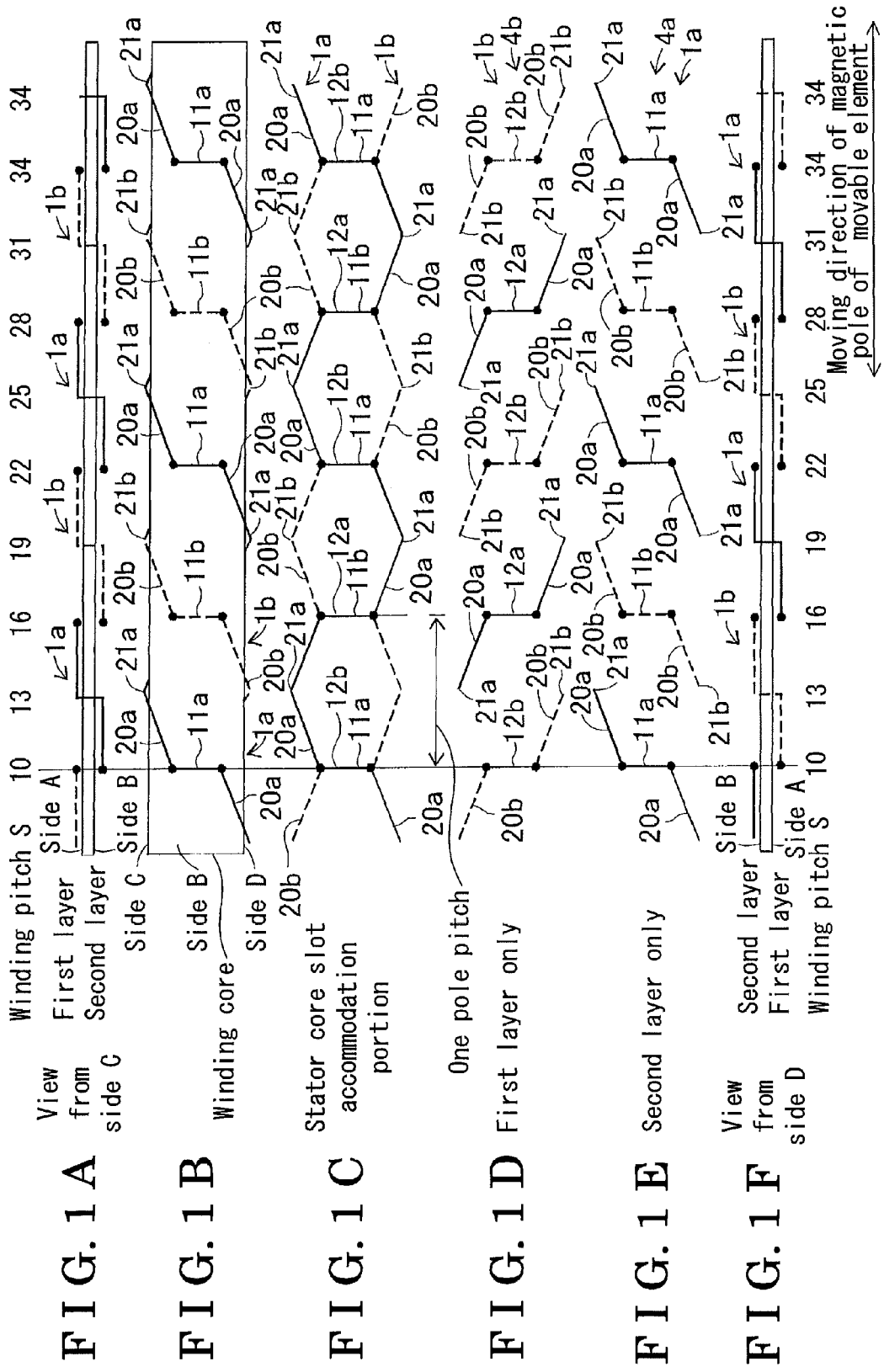

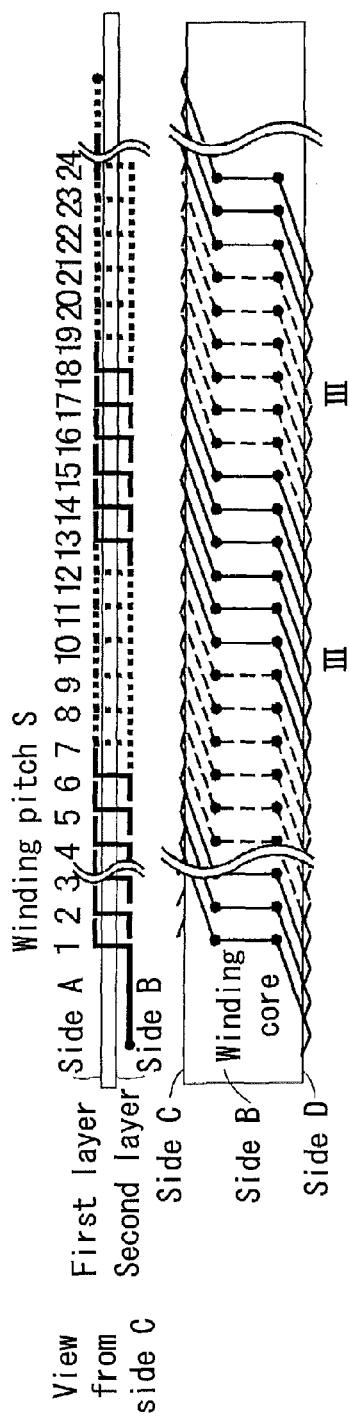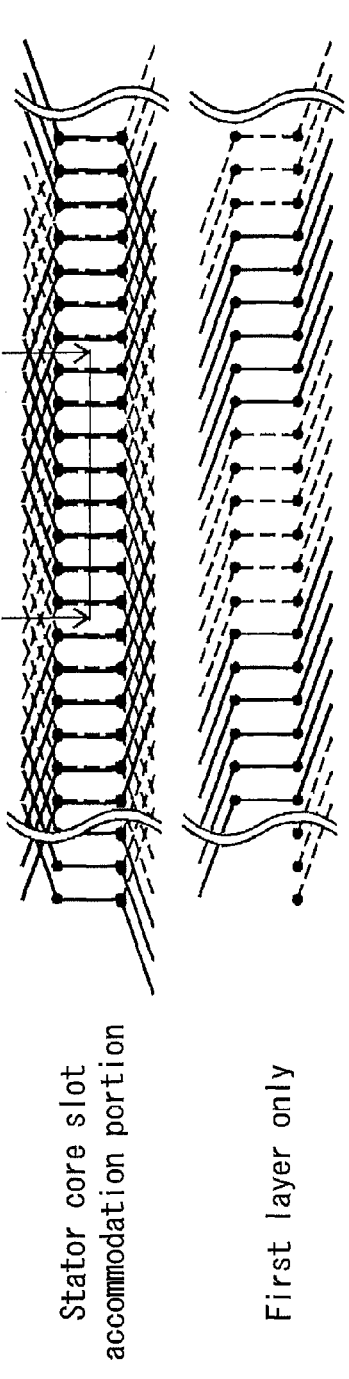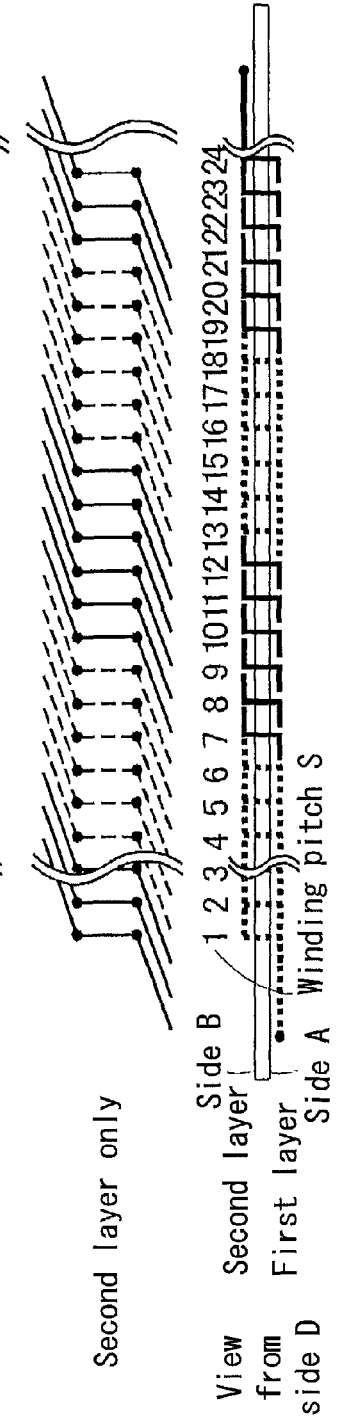

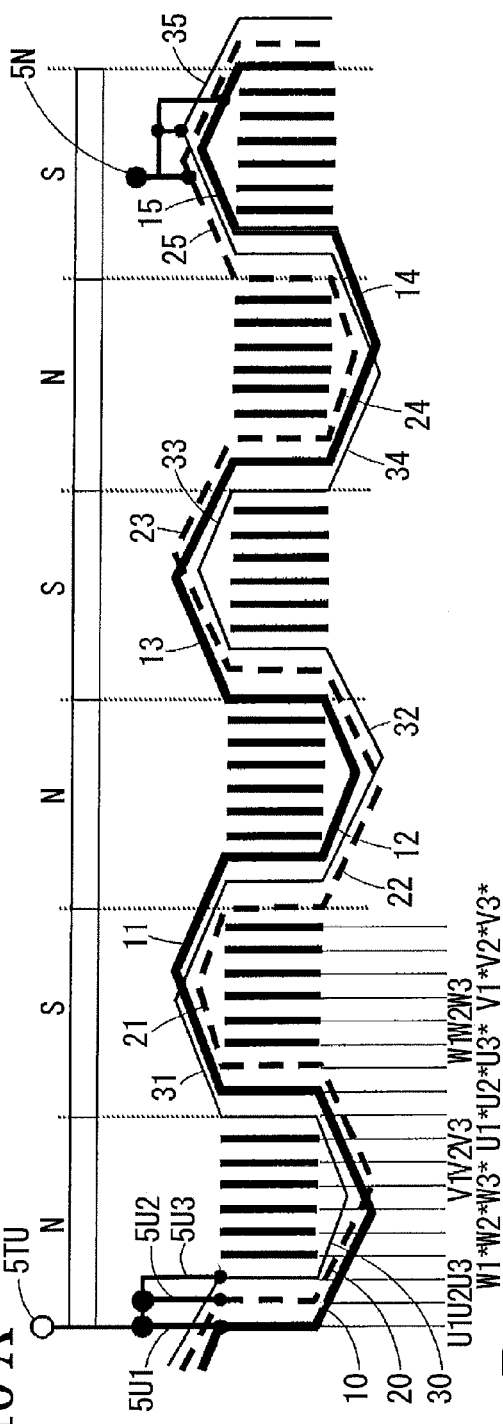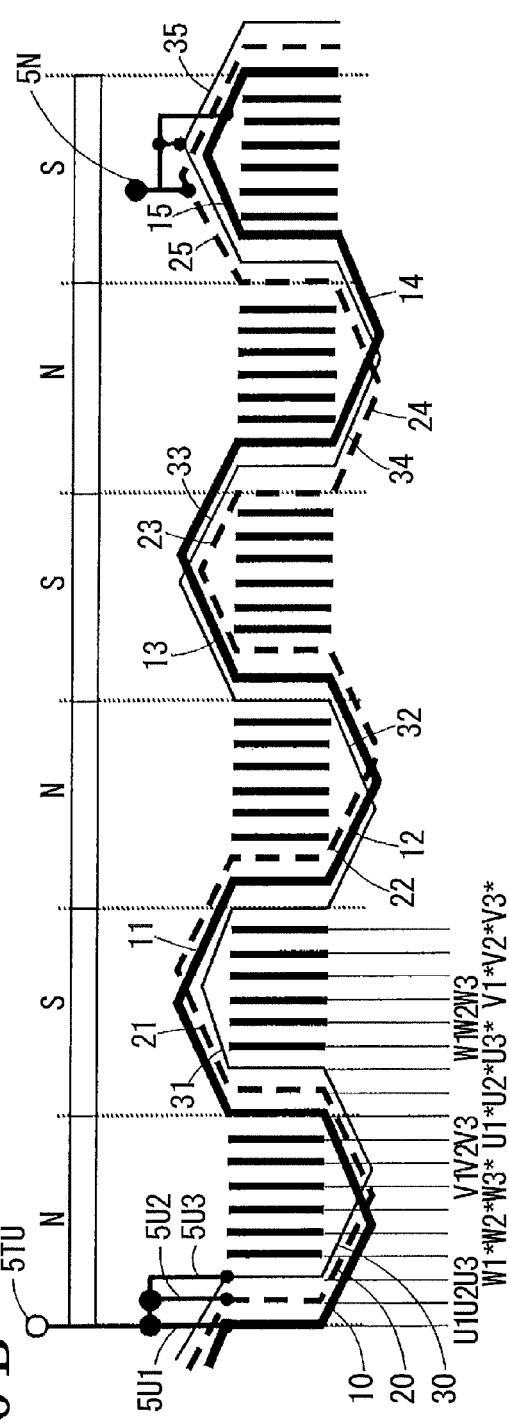
FIG. 10A
FIG. 10B

WAVE WINDING COIL FOR ROTARY ELECTRICAL MACHINE

CROSS REFERENCE TO RELATED APPLICATIONS

This application is based on and claims priority under 35 U.S.C. §119 to Japanese Patent Application 2011-276884, filed on Dec. 19, 2011, the entire content of which is incorporated herein by reference.

TECHNICAL FIELD

This disclosure generally relates to a wave winding coil for a rotary electrical machine.

BACKGROUND DISCUSSION

As a method for winding a stator winding and/or a rotor winding of a rotary electrical machine including, for example, a motor, wave winding where a coil conductor is wound in a wavy state is known. As an example of a known rotary electrical machine having a wave winding configuration, a rotary electrical machine provided with a wave winding coil is disclosed in JP3952346B (hereinafter referred to as Patent reference 1). According to Patent reference 1, a three-phase wave winding configuration is established by using six pieces of coil sides that are arranged apart from each other by one slot pitch.

The coil side for one phase includes an up conductor portion at which a coil is wound in a direction away from a phase terminal and a down conductor portion at which the coil is wound in a direction closer to the phase terminal. The coil sides each wound in the wave winding are connected to each other in series at a side opposite to the phase terminal. Here, the winding wire that is serially connected in a manner that the up conductor portion includes the wave winding configuration is referred to as an up winding portion and the winding wire that is serially connected in a manner that the down conductor portion includes the wave winding configuration is referred to as a down winding portion. At a phase unit coil, that is, a winding coil for one phase, the up winding portion and the down winding portion are serially connected to each other.

However, Patent reference 1 discloses a known wave winding configuration where the number of kinds of the coil side at each magnetic pole of each phase is one, or a wave winding configuration including a stator structure in which the number of slots at each magnetic pole of each phase is one and which includes one kind of coil side that is accommodated in the slot of the stator. Here, in a case where there are plural kinds of the coil side at each magnetic pole of each phase or in a case where the stator structure includes plural number of the slots at each magnetic pole of each phase and thus the number of the kinds of the coil sides accommodated in the respective slots is increased to be plural, all the coil sides in the same phase need to be serially connected to each other because induced voltage generated at each coil side in the same phase differs from each other, and thus a circulating current in a phase is generated, which may lead to decrease in output of the rotary electrical machine. The known wave winding configuration will be described with reference to FIGS. 12 and 13.

FIG. 12 schematically illustrates a phase configuration of the rotary electrical machine including two kinds of coil side at each magnetic pole of each phase. The rotary electrical machine illustrated in FIG. 12 includes a known wave winding configuration where the number of kinds of the coil side at each magnetic pole of each phase is two or a wave winding configuration including a stator structure where the number of slots at each magnetic pole of each phase is two and including the two kinds of coil side accommodated in the slots of the stator. FIG. 13 schematically illustrates a connection status of U-phase coils illustrated in FIG. 12. FIG. 12 illustrates an example where the number of the kinds of the coil side at each magnetic pole of each phase is increased to be plural by connecting a phase unit coil 9X1 and a phase unit coil 9X2 (X refers to any one of phases U, V and W) with each other in parallel. For example, at a phase unit coil 9U1 of a U-phase, an up winding portion 9U1$a$ and a down winding portion 9U1$b$ are connected to each other in series, and at a phase unit coil 9U2, an up winding portion 9U2$a$ and a down winding portion 9U2$b$ are connected to each other in series. The same will apply to a V phase and to a W phase. The two kinds of the coil side at each magnetic pole of each phase are apart from each other by one winding pitch in a moving direction of a magnetic pole of a movable element.

Related to the two kinds of the coil side at each magnetic pole of each phase, the induced voltage generated at the phase unit coil 9U1 at which the coil sides of the same kind are serially connected to each other and the induced voltage generated at the phase unit coil 9U2 at which the coil sides of the same kind are serially connected to each other are different from each other. This is because the phase unit coil 9U1 and the phase unit coil 9U2 are in a same phase to each other (that is, the U phase), however, precisely speaking, phases thereof are different from each other as the coil sides thereof are apart from each other by one winding pitch in the moving direction of the magnetic pole of the movable element. For example, the induced voltage generated at the coil sides of the phase unit coil 9U1 is assumed to be higher than the induced voltage generated at the coil sides of the phase unit coil 9U2 at a predetermined time. In this case, the coil sides at which the respective induced voltages are relatively high are serially connected to each other at the phase unit coil 9U1, and the coil sides at which the respective induced voltages are relatively low are serially connected to each other at the phase unit coil 9U2. Where the induced voltages generated at the phase unit coils 9U1 and 9U2 are 9E1 and 9E2, respectively, the induced voltage 9E1 is higher than the induced voltage 9E2, and thus the circulating current is generated in the U phase. The above-mentioned explanation applies also to the V phase and the W phase, and output of the known rotary electrical machine is decreased due to the circulating current in each of the phases.

A need thus exists for a wave winding coil for a rotary electrical machine, which is not susceptible to the drawback mentioned above.

SUMMARY

According to an aspect of this disclosure, a wave winding coil for a rotary electrical machine includes a coil conductor including coil side portions and coil end portions, each of the coil side portions is configured to be provided by insertion at each slot of a stator core and to be positioned in the slot in an alternating manner, each of the coil end portion being formed integrally with each of the coil side portions and connecting end portions of the coil side portions to each other, the end portions of the side portions are located at an identical side in a direction of the coil side portion, the coil conductor is wound to include a wave winding configuration, wherein one coil side portion is selected at each of magnetic poles from among n kinds of coil side portions which are arranged at each of the magnetic poles of each phase, the n kinds of coil side portions are in a same phase and includes different electromagnetic phase from each other, n refers to a natural number, the coil side portions selected for a required number of the magnetic poles are serially connected to each other at the coil end portions of the coil side portions for forming a phase unit coil, plural phase unit coils are parallelly connected to each other for forming a phase coil, each of the plural phase unit coils includes the selected coil side portions that are different from each other, each of the phase unit coils of the phase coil includes all of the n kinds in a manner that an identical number of each of the n kinds of coil side portion is included in each of the phase unit coil, the coil side portions are selected in a manner that the number of the coil side portions serially connected to each other is identical to each other between the plural phase unit coils, a relational expression expressing a total number of the coil side portions included in the phase coil is expressed by a mathematical expression 1, the mathematical expression 1 refers to m×k=n×q×2p, and m refers to the number of the phase unit coils that are parallelly connected to each other, k refers to the number of the coil side portions that are serially connected to each other, q refers to the number of serially-connected-conductors per magnetic pole, the serially-connected-conductor belongs to one of the kinds of the coil side portions, 2p refers to the number of the magnetic pole, m refers to a common divisor between q×2p and n.

BRIEF DESCRIPTION OF THE DRAWINGS

The foregoing and additional features and characteristics of this disclosure will become more apparent from the following detailed description considered with the reference to the accompanying drawings, wherein:

FIG. 1A schematically illustrates a state, for one phase, of layer change of a coil conductor arranged across first and second layers in a manner that a portion of the coil conductor which connects the first and second layers is minimized, when viewed from a side C of FIG. 1B according to a first embodiment;

FIG. 1B illustrates a state where a coil conductor for one phase is wound around a winding core according to the first embodiment;

FIG. 1C illustrates a state where the winding core is removed from the state of FIG. 1B;

FIG. 1D illustrates a state where the coil conductor for one phase is wound, at a back side (a side A) of a paper surface on which FIG. 1D is drawn (that is, a perspective view viewed from a side B) according to the first embodiment;

FIG. 1E illustrates a state where the coil conductor for one phase is wound, at a front side (a side B) of the paper surface on which FIG. 1E is drawn according to the first embodiment;

FIG. 1F schematically illustrates the state of the layer change of the coil conductor, for one phase, arranged across the first and second layers in a manner that the portion of the coil conductor which connects the first and second layers is minimized, when the state of FIG. 1B is viewed from a side D of FIG. 1B;

FIG. 2A schematically illustrates the state, for three phases, of the layer change of the coil conductor arranged across the first and second layers in a manner that the portion of the coil conductor which connects the first and second layers is minimized, when viewed from a side C of FIG. 2B according to a second embodiment;

FIG. 2B illustrates a state where the coil conductors for three phases are wound around the winding core according to the second embodiment;

FIG. 2C illustrates a state where the winding core is removed from the state of FIG. 2B;

FIG. 2D illustrates a state where the coil conductor is wound for three phases, at a back side (a side A) of a paper surface on which FIG. 2D is drawn (that is, a perspective view viewed from a side B) according to the second embodiment;

FIG. 2E illustrates a state where the coil conductor is wound for three phases, at a front side (a side B) of the paper surface on which FIG. 2E is drawn;

FIG. 2F schematically illustrates the state of the layer change of the coil conductor, for three phases, arranged across the first and second layers in a manner that the portion of the coil conductor which connects the first and second layers is minimized, when the state of FIG. 2B is viewed from a side D of FIG. 2B;

FIG. 10A is a view developed in a circumferential direction of a rotary electrical machine including three kinds of coil side portions at each magnetic pole of each phase according to a fourth embodiment, illustrating an example of a connection status of U-phase coils where a full-pitch winding portion is not included;

FIG. 10B is a view developed in the circumferential direction of the rotary electrical machine including the three kinds of coil side portions at each magnetic pole of each phase according to the fourth embodiment, illustrating an example of a connection status of the U-phase coils where the full-pitch winding portion is included in part of the phase unit coil;

DETAILED DESCRIPTION

Figure 3:
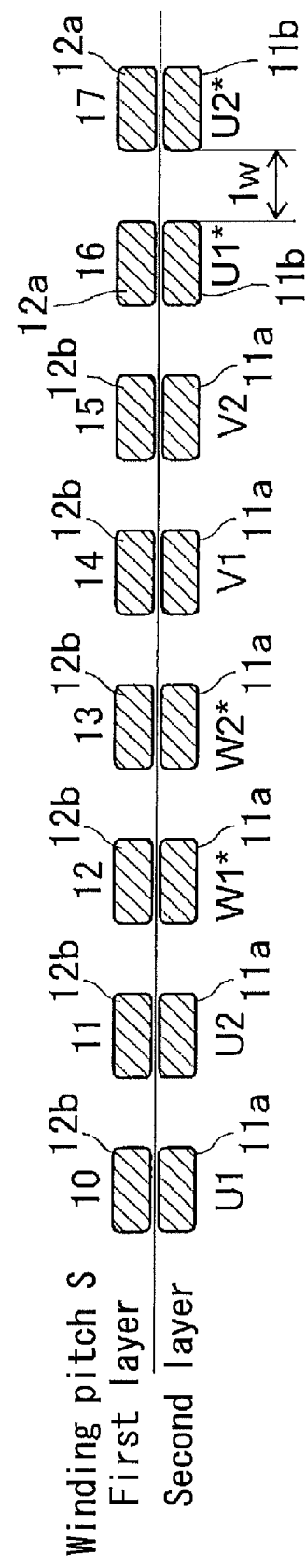
FIG. 3 is a cross-sectional view taken along line III-III in FIG. 2C.

Embodiments related to this disclosure will be explained with reference to the drawings. In each of the embodiments, the same reference numbers designate the same or corresponding portions, and therefore, description of these portions is omitted. Each of the drawings is a schematic view and does not specify a dimension of structural detail.

(1) First Embodiment

A wave winding coil for a rotary electrical machine of the first embodiment corresponds to a helically-wound sheet-shaped coil in which coil conductors are linked to each other in a helical state so as to establish a wave winding configuration. First, the helically-wound sheet-shaped coil will be explained in detail. FIGS. 1A to 1F schematically illustrate a unit coil for one phase of the helically-wound sheet-shaped coil.

Solid lines in FIGS. 1A to 1F illustrate a state where the coil conductor is wound starting at a position of a winding pitch S10 at every six winding pitches. At the position of the winding pitch S10, a coil unit 1a, which is illustrated in the solid line, is wound in a direction from a front side (a side B) of a paper surface on which FIG. 1A is drawn to a back side (a side A) of the paper surface. At winding pitches S10, S16, S22, S28 and S34, the coil unit 1a includes a coil side portion 10a (that is, an up conductor portion 11a, a down conductor portion 12a) extending linearly in a short direction of a winding core (the direction orthogonal to an axis of the winding core). The coil side portion 10a defined when the coil conductor is wound from the side B to the side A is referred to as the up conductor portion 11a and the coil side portion 10a defined when the coil conductor is wound from the side A to the side B is referred to as the down conductor portion 12a. An end portion of the up conductor portion 11a and an end portion of the down conductor portion 12a, the end portions which are located at a same side in a direction of the coil side portion 10a, 10b, are connected to each other by means of a coil end portion 20a formed integrally with the coil side portion 10a. The coil end portion 20a is wound and turned at each winding pitches S13, S19, S25, S31 and S37 so as to form a wound-and-turned portion 21a. In the embodiments of this disclosure, the term "connect" and derivatives thereof refer to "electrically connect", unless otherwise specified.

As illustrated in FIGS. 1A to 1F, in the embodiments, the coil conductor including the coil end portion 20a for one-half a pole pitch, the up conductor portion 11a, the coil end portion 20a for one pole pitch, the down conductor portion 12a, the coil end portion 20a for one-half a pole pitch is referred to as a coil element 4a. The coil conductor in a state where the coil elements 4a are arranged and connected to each other in a lengthwise direction of the winding core (an axial direction of the winding core) at every two pole pitches is referred to as the coil unit 1a (serving as the coil conductor).

Dotted lines in FIGS. 1A to 1F illustrate the state where the coil conductor is wound starting at the position of the winding pitch S10 at every six winding pitches (one pole pitch) in a similar manner to the coil unit 1a illustrated in the solid line. A coil unit 1b (serving as the coil conductor), which is illustrated in the dotted line, is different from the coil unit 1a in that the coil unit 1b is wound in a direction from the back side of the paper surface (the side A) on which FIG. 1A is drawn to the front side of the paper surface (the side B) at the position of the winding pitch S10. In a similar manner to the coil unit 1a illustrated in the solid line, the coil unit 1b illustrated in the dotted line is formed with a coil side portion 10b (that is, an up conductor portion 11b, a down conductor portion 12b) at the winding pitches S10, S16, S22, S28 and S34. The coil side portion 10b includes the up conductor portion 11b and the down conductor portion 12b. The end portion of the up conductor portion 11b and the end portion of the down conductor portion 12b, the end portions which are located at a same side, are connected to each other by means of a coil end portion 20b formed integrally with the coil side portion 10b. The coil end portion 20b is wound and turned at each of the winding pitches S13, S19, S25, S31 and S37 so as to form a wound-and-turned portion 21b.

In a similar manner to the coil unit 1a, in the embodiments, the coil conductor including the coil end portion 20b for one-half a pole pitch, the up conductor portion 11b, the coil end portion 20b for one pole pitch, the down conductor portion 12b, the coil end portion 20b for one-half a pole pitch is referred to as a coil element 4b. The coil conductor in a state where the coil elements 4b are arranged and connected to each other in the lengthwise direction of the winding core (the axial direction of the winding core) at every two pole pitches is referred to as the coil unit 1b. The coil unit 1a illustrated in the solid line and the coil unit 1b illustrated in the dotted line are provided as a pair in a sheet thickness direction.

After the coil side portion 10a of the coil unit 1a and the coil side portion 10b of the coil unit 1b are pressure-formed so as to be adjacent and closely adhered to each other in a direction orthogonal to the paper surface, the coil side portion 10a and the coil side portion 10b are arranged apart from each other by two pole pitches, across two layers in the lengthwise direction of the winding core (the axial direction of the winding core). The coil side portion 10a and the coil side portion 10b which are formed at the back side (the side A) of the paper surface are referred to as a first layer and the coil side portion 10a and the coil side portion 10b which are formed at the front side (the side B) of the paper surface are referred to as a second layer. Each of FIGS. 1A and 1F illustrates a state of layer change of the coil conductor between the first and second layers when viewed from a side C or a side D which are illustrated in FIG. 1B. FIGS. 1A and 1F schematically illustrate the state of the layer change in a manner that a portion of the coil conductor which connects the first and second layers is minimized. In a state where the coil units 1a and 1b are provided at or attached to a stator core 50, the lengthwise direction of the winding core illustrated in FIG. 1B (the axial direction of the winding core) corresponds to a moving direction of a magnetic pole 61 of a movable element 60. The stator core 50 is provided with a stator core magnetic pole 51 (that is, the magnetic pole 51) and with a slot 52.

FIG. 2A schematically illustrates the helically-wound sheet-shaped coil for three phases. FIGS. 2A to 2F correspond to FIGS. 1A to 1F, respectively. More specifically, the winding pitch S in FIG. 2A corresponds to the winding pitch S in FIG. 1A. FIG. 3 is a cross-sectional view taken along line III-III in FIG. 2C. In the first embodiment, the coil element 4a illustrated in a solid line and the coil element 4b illustrated in a dotted line which are adjacent to each other in the same slot 52 are arranged as a pair. The pair of coil elements 4a and 4b are arranged in the lengthwise direction of the winding core (the axial direction of the winding core) at every two pole pitches. For example, as illustrated in FIGS. 2A to 2F and 3, the coil element 4a is formed between the second layer of the winding pitch S10 and the first layer of the winding pitch S16, and the coil element 4b, which is the other coil element of the pair, is formed between the first layer of the winding pitch S10 and the second layer of the winding pitch S16. In a similar manner, the coil element 4a is formed between the second layer of the winding pitch S11, which is advanced from the winding pitch S10 by one winding pitch, and the first layer of the winding pitch S17, and the coil element 4b, which is the other coil element of the pair, is formed between the first layer of the winding pitch S11 and the second layer of the winding pitch S17. That is, the coil element 4a is positioned in the respective slots 52 in an alternating manner between the first and second layers, and the coil element 4b is positioned in the respective slots 52 in the alternating manner between the first and second layers.

In the first embodiment, as illustrated in FIG. 3, the coils are configured in an order of: the U phase (a forward direction U1), the U phase (the forward direction U2), the W phase (a reverse direction W1 followed by an asterisk), the W phase (the reverse direction W2 followed by an asterisk), the V phase (the forward direction V1), the V phase (the forward direction V2), the U phase (the reverse direction U1 followed by an asterisk) and the U phase (the reverse direction U2 followed by an asterisk) in the moving direction of the magnetic pole 61 of the movable element 60. The forward and reverse directions refer to flow directions of electric current. In the first embodiment, two of the coils in the same phase, that is, the coil units 1a and 1b in the same phase, are arranged adjacent to each other in the moving direction of the magnetic pole 61 of the movable element 60, and a winding wire unit of the coils in the same phase is constituted by four. The coil units 1a, 1b, 1a and 1b in the same phase are connected to each other so that the flow direction of electric current coincides with each other in a case where the rotary electrical machine is actuated. Thus, the three-phase winding wire is constituted by the winding wire units corresponding to twelve. As illustrated in FIG. 3, the coil side portions that are adjacent to each other in the moving direction of the magnetic pole 61 of the movable element 60 are arranged apart from each other by a predetermined interval 1W so that a magnetic tooth portion of the stator core 50 is accommodated in the predetermined interval 1W.

As illustrated in FIG. 3, the coil side portion of an X1 phase (X refers to any one of the phases U, V and W, the same hereinafter) and the coil side portion of an X2 phase are apart from each other by one winding pitch in the moving direction of the magnetic pole 61 of the movable element 60, and thus the coil units 1a and 1b of the X1 phase and the coil units 1a and 1b of the X2 phase are apart from each other by one winding pitch in the moving direction of the magnetic pole 61 of the movable element 60. For example, it is assumed that a phase unit coil 5X1 is formed by serially connecting the coil units 1a and 1b of the X1 phase to each other, a phase unit coil 5X2 is formed by serially connecting the coil units 1a and 1b of the X2 phase to each other, and a phase coil 6X is formed by connecting the phase unit coils 5X1 and 5X2 in parallel with each other. In this case, the phase unit coils 5X1 and 5X2 are apart from each other by one winding pitch in the moving direction of the magnetic pole 61 of the movable element 60, and therefore the phases of the phase unit coils 5X1 and 5X2 are, precisely speaking, different from each other even though the phase unit coils 5X1 and 5X2 are in the same phase (the X phase), which is referred to as "the phases are electromagnetically different" in the embodiments of this disclosure. Accordingly, the induced voltage generated at the phase unit coils 5X1 and the induced voltage generated at the 5X2 are different from each other, and thus the circulating current is generated in the phase, thereby decreasing the output of the rotary electrical machine.

Figure 4:
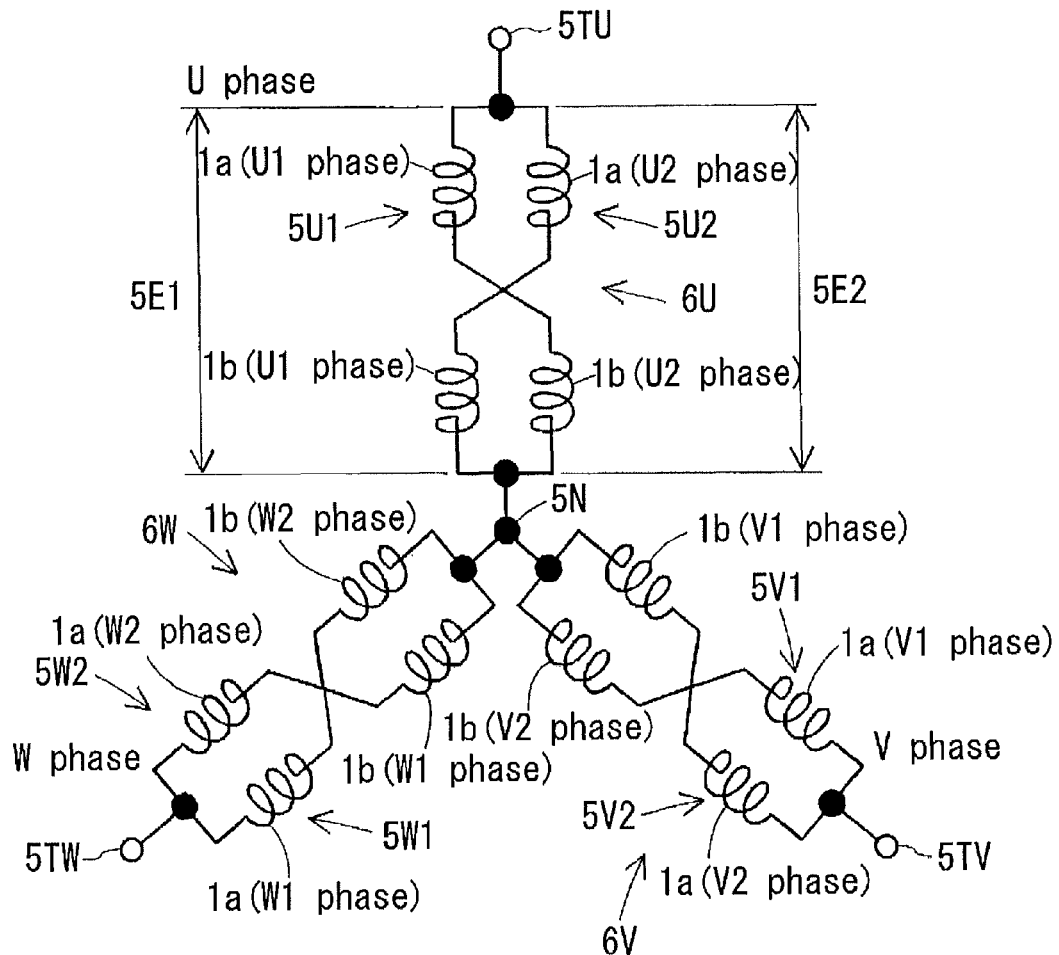
FIG. 4 schematically illustrates a phase configuration of the helically-wound sheet-shaped coil of the first embodiment.
Figure 5:
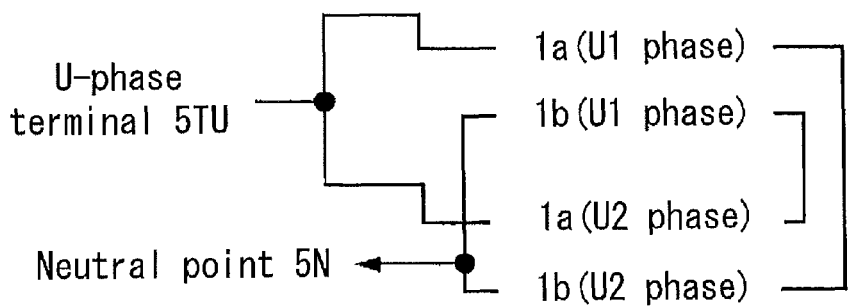
FIG. 5 schematically illustrates a connection status of U phase coils of FIG. 4.

FIG. 4 schematically illustrates a phase configuration of the helically-wound sheet-shaped coil. FIG. 5 schematically illustrates a connection status of U phase coils of FIG. 4. In the first embodiment, the coil unit 1a of the X1 phase and the coil unit 1b of the X2 phase are connected to each other in series so as to form the phase unit coil 5X1. The coil unit 1a of the X2 phase and the coil unit 1b of the X1 phase are connected to each other in series so as to form the phase unit coil 5X2. The phase unit coils 5X1 and 5X2 are connected to each other in parallel so as to form the phase coil 6X. As illustrated in FIGS. 4 and 5, an X-phase terminal is referred to as an X-phase terminal 5TX, and a neutral point is referred to as a neutral point 5N.

For example, it is assumed that the induced voltage generated at the coil side portion of the X1 phase is higher than the induced voltage generated at the coil side portion of the X2 phase at a predetermined time. In this case, the coil unit 1a of the X1 phase at which the induced voltage is relatively high is serially connected to the coil unit 1b of the X2 phase at which the induced voltage is relatively low so as to form the phase unit coil 5X1. In addition, the coil unit 1a of the X2 phase at which the induced voltage is relatively low is serially connected to the coil unit 1b of the X1 phase at which the induced voltage is relatively high so as to form the phase unit coil 5X2. Here, an induced voltage 5E1 generated between end portions of the winding wire of the phase unit coil 5X1 is equal to an induced voltage 5E2 generated between end portions of the winding wire of the phase unit coil 5X2, and therefore no circulating current is generated in the X phase. Thus, the reduction in the output due to the circulating current in the phase does not occur, and therefore the output of the rotary electrical machine is maintained. This will apply also to a case where the induced voltage generated at the coil side portion of the X1 phase is lower than the induced voltage generated at the coil side portion of the X2 phase. In addition, the first embodiment includes the wave winding configuration having a stator-circumference-multiple, that is, a circumferential length of the phase unit coil 5X1, 5X2 is a natural-number multiple of a circumferential length of the stator. Thus, even in a case where, for example, variations occur in field flux due to eccentricity of the rotor and the like, the induced voltages which are substantially equal to each other between the phases are generated at the phase coils 6X and each of the induced voltages generated at the phase coils 6X include a phase difference of 120 degrees (an electrical angle) therebetween in the order of the phases. Consequently, the output of the rotary electrical machine is not decreased by an inner circulating current between the phases, and thus the output of the rotary electrical machine is maintained.

Figure 6A:
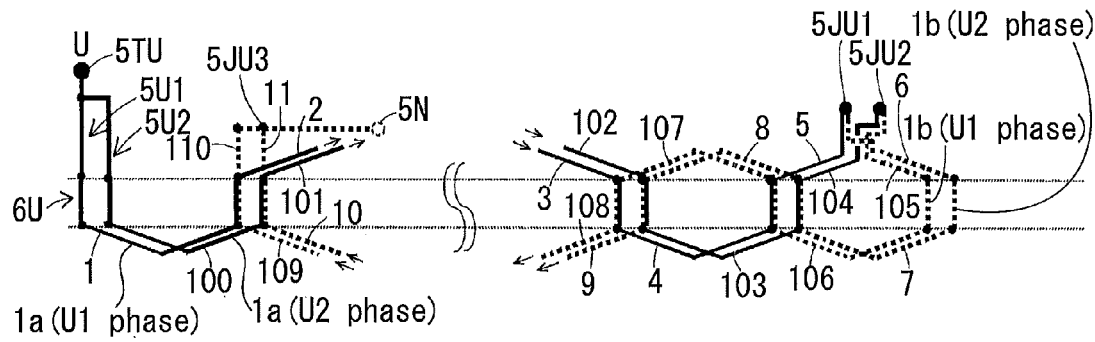
FIG. 6A schematically illustrates a configuration of end portions (a sheet-end connection) of the helically-wound sheet-shaped coil at the U phase when viewed in a sheet thickness direction according to the first embodiment.
Figure 6B:
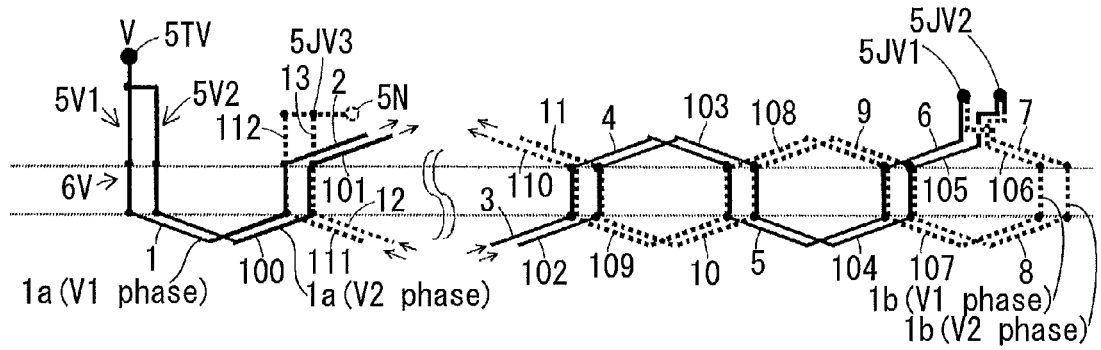
FIG. 6B schematically illustrates a configuration of end portions (a sheet-end connection) of the helically-wound sheet-shaped coil at a V phase when viewed in the sheet thickness direction according to the first embodiment.
Figure 6C:
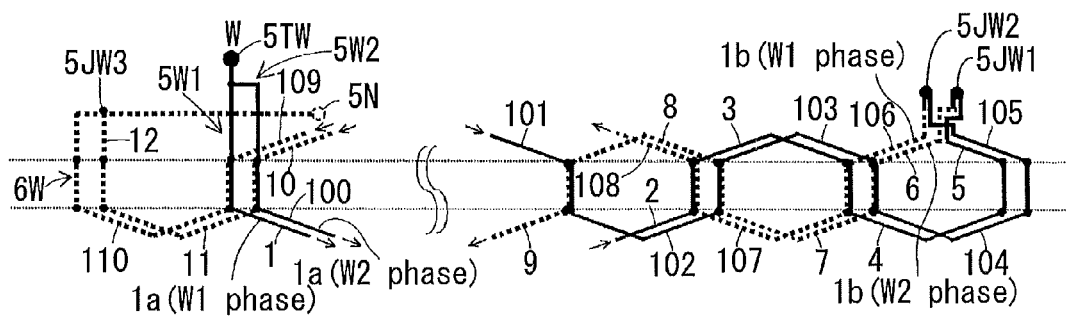
FIG. 6C schematically illustrates a configuration of end portions (a sheet-end connection) of the helically-wound sheet-shaped coil at a W phase when viewed in the sheet thickness direction according to the first embodiment.
Figure 6D:
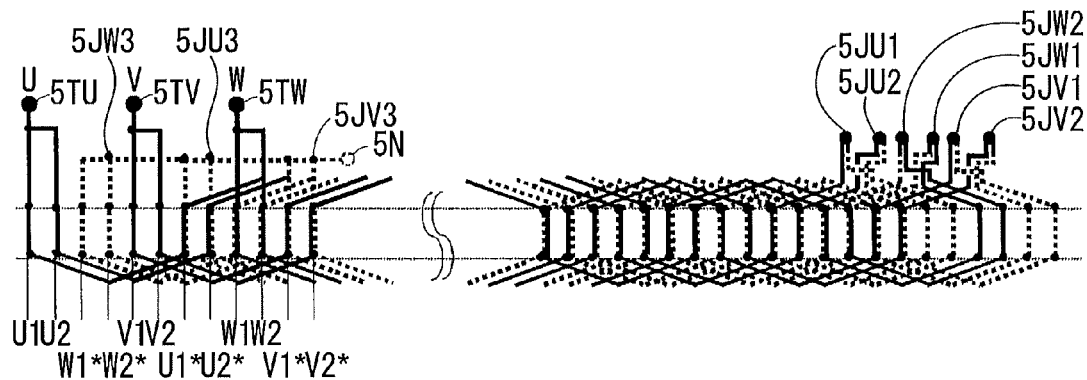
FIG. 6D schematically illustrates the configuration of the end portions (the sheet-end connection) of the helically-wound sheet-shaped coil at the U, V and W phases when viewed in the sheet thickness direction according to the first embodiment.

FIGS. 6A to 6D schematically illustrate a configuration of end portions (a sheet-end connection) of the helically-wound sheet-shaped coil. FIGS. 6A to 6D illustrate a connection status of the winding wire at a sheet end portion in the sheet thickness direction. FIGS. 6A to 6C illustrate the connection statuses for one phase at the U phase, V phase and W phase, respectively. FIG. 6D illustrates the connection status for the three phases. As illustrated in FIGS. 6A to 6D, the coil unit $1a$ is illustrated in a solid line and the coil unit $1b$ is illustrated in a dotted line in a similar manner to FIGS. 1A to 1F and 2A to 2F. Reference numbers appearing in FIGS. 6A to 6C indicate a connection order in which the wire is connected from the phase terminal 5TX to the neutral point 5N. Because the phase unit coils 5X1 and 5X2 are connected to each other in parallel, a connection order of the winding wire of the phase unit coil 5X1 is indicated with reference numbers starting with 1 and a connection order of the winding wire of the phase unit coil 5X2 is indicated with reference numbers starting with 100 for convenience of the explanation. The explanation will be made hereunder on the basis of FIG. 6A using the U phase as an example, which applies also to the V phase and the W phase.

The coil unit $1a$ of a U1 phase and the coil unit $1b$ of a U2 phase are connected to each other in series so as to form a phase unit coil 5U1. The coil unit $1a$ of the U1 phase is wound starting at the U-phase terminal 5TU in the right direction on a paper surface on which FIG. 6A is drawn (refer to reference numbers 1 to 5). The coil unit $1a$ of the U1 phase is connected, that is, re-connected, to the coil unit $1b$ of the U2 phase at a connecting point 5JU1 located at the sheet end portion. The coil unit $1b$ of the U2 phase is wound back in the left direction on the paper surface at the connecting point 5JU1 (refer to reference numbers 6 to 11) and then connected to the neutral point 5N.

The coil unit $1a$ of the U2 phase and the coil unit $1b$ of the U1 phase are connected to each other in series so as to form a phase unit coil 5U2. The coil unit $1a$ of the U2 phase is wound starting at the U-phase terminal 5TU in the right direction on the paper surface on which FIG. 6A is drawn (refer to the reference numbers 100 to 104). The coil unit $1a$ of the U2 phase is connected to the coil unit $1b$ of the U1 phase at a connecting point 5JU2 located at the sheet end portion. The coil unit $1b$ of the U1 phase is wound back in the left direction on the paper surface at the connecting point 5JU2 (refer to the reference numbers 105 to 110), connected to the coil unit $1b$ of the U2 phase at a connecting point 5JU3 located at the sheet end portion, and then connected to the neutral point 5N. The phase unit coil 5U1 and the phase unit coil 5U2 are connected to each other in parallel so as to form a phase coil 6U. The coil units $1a$ and $1b$ of the U2 phase are apart from the coil units $1a$ and $1b$ of the U1 phase by one winding pitch in the moving direction of the magnetic pole 61 of the movable element 60 (in the right direction on the paper surface on which FIG. 6A is drawn), and the unit coils $1a$ and $1b$ are provided as a pair in the sheet thickness direction. Alternatively, the coil unit $1b$ of the U1 phase may be routed to the neutral point 5N without performing the connecting processing at the connecting point 5JU3, so that the connecting processing for all of the three phases is performed at the neutral point 5N.

According to the first embodiment, the re-connection between the coil side portions is performed at end portions of the helically-wound sheet-shaped coil in the moving direction of the magnetic pole of the movable element, and therefore the coils are manufactured easily and an operation performance is enhanced. In addition, the coil end portions in the same phase, whose coil side portions are re-connected, are not overlapped with each other in the sheet thickness direction, and thus the coil end portions at which the coil side portions are re-connected are made compact. That is, the coil end portions at which the coil side portions are re-connected are overlapped with each other in a direction orthogonal to the moving direction of the magnetic pole of the movable element. Further, according to the first embodiment, the coils are connected to each other at the sheet end portion in the moving direction of the magnetic pole 61 of the movable element 60. Accordingly, the connection between the coil units $1a$ and $1b$ of the phase unit coils 5X1 and 5X2 may be established after each of the coil units $1a$ and $1b$ is wound, which makes the manufacturing of the coils easy and enhances the operation performance.

Next, the winding wire of the helically-wound sheet-shaped coil will be described. In the first embodiment, a surface of the conductor of the winding wire is coated with an insulating layer including, for example, enamel. A cross-sectional shape of the winding wire is not specifically limited and may include any desired shape. For example, winding wires of a various kinds of cross-sectional shapes, including, for example, a round wire having a circular-shaped cross section and a rectangular wire having a polygon-shaped cross section, may be used. Further, the winding wire constituted by combining plural thinner winding strands may be used. The coil units $1a$ and $1b$ may be formed, for example, by being wound around the winding core to form a helical configuration. The winding may be performed by winding one wire by one, or plural wires are wound at the same time. For example, a pin or a groove may be provided at the winding core, and the winding wire may be wound around the winding core while the pin or groove is used as a guide for winding so that the winding pitch S is ensured. After completion of winding all the wires as illustrated in FIGS. 2A to 2F, the winding core is removed from the wound wires, and the winding wires are pressure-formed so that the coil side portions $10a$ and $10b$, which constitute a pair of coil units $1a$ and $1b$, are adjacent and closely adhered to each other in the direction orthogonal to the paper surface on which FIGS. 2A to 2F are drawn. In consideration of possible damages made to the winding wire during the pressure-forming, for example, resin coating for a purpose of repairing the damaged wire may be applied after completion of the pressure-forming.

Figure 7:
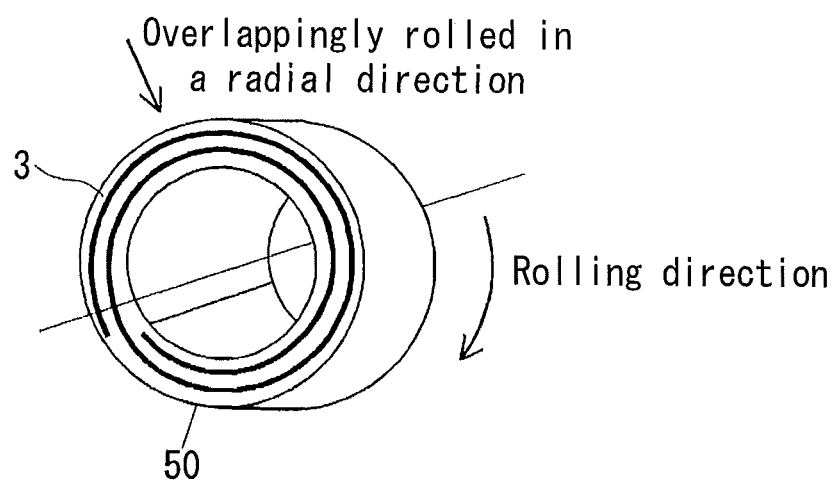
FIG. 7 schematically illustrates the helically-wound sheet-shaped coil rolled so as to be overlapped in a radial direction of a stator core according to the first embodiment.

At the end of this section, a method for mounting or attaching the helically-wound sheet-shaped coil to the stator core 50 will be explained. FIG. 7 schematically illustrates the helically-wound sheet-shaped coil rolled so as to be overlapped in a radial direction of the stator core 50. In the first embodiment, as illustrated in FIG. 7, a helically-wound sheet-shaped coil 3 constituted by the two layers is rolled so as to be overlapped in the radial direction of the stator core 50, and the embodiment may be applied to a cylindrical rotary electrical machine of a radial type where a rotor and a stator are arranged in a radial direction thereof concentrically relative to each other.

In a case where the helically-wound sheet-shaped coil 3 is mounted or attached to the stator core 50, first, the helically-wound sheet-shaped coil 3 is rolled up in a spiral shape, and is then accommodated at an inner circumferential side of the stator core 50. The helically-wound sheet-shaped coil 3 that is rolled in the spiral shape is mounted to the stator core 50 while being unrolled from an outer circumferential side thereof. In a case where an entire helically-wound sheet-shaped coil 3 that is rolled in the spiral shape is not accommodated at the inner circumferential side of the stator core 50, part of the helically-wound sheet-shaped coil 3 which is not accommodated thereat, or the entire helically-wound sheet-shaped coil 3 may be arranged in a planar state outside an axially end portion of the stator core 50, and may be mounted to the stator core 50 in a manner that the sheet is supplied from the outside of the stator core 50 while being rolled up in the spiral shape.

After the helically-wound sheet-shaped coil 3 is attached to the stator core 50, connecting and drawing processing on the wires is performed at the phase terminal 5TX and at the connecting processing is performed at the neutral point 5N. According to the first embodiment, the configuration of the end portion of the helically-wound sheet-shaped coil 3 is configured by means of the sheet-end connection as illustrated in FIGS. 6A to 6F, and therefore the connection of the winding wires at connecting points 5JX1 and 5JX2 both located at the sheet end portion are performed together therewith. After connecting of the winding wires for the three phases is completed, the winding wires are secured to the stator core 50 by means of, for example, varnishing or resin-molding.

According to the first embodiment, the coil elements 4a and 4b that are adjacent to each other in the same slot 52 are arranged as the pair, and the coil elements 4a and 4b are arranged at every two pole pitch in the moving direction of the magnetic pole 61 of the movable element 60. Accordingly, a relative positional relationship of the coil elements 4a and 4b relative to each other in the moving direction of the magnetic pole 61 of the movable element 60 is maintained. Further, the go conductor portions 11a and 11b and the return conductor portions 12a and 12b, which are arranged in different layers of the coil side portion 10a and 10b that are formed in the two layers in the thickness direction, are linked in turn to each other at the coil end portions 20a and 20b in the helical state, and are connected to each other to form the wave winding configuration, thereby forming the coil units 1a and 1b. Thus, the layer change is performed per conductor at the coil end portions 20a and 20b in an orderly manner in which the conductors are aligned. Accordingly, the coil end portions 20a and 20b are prevented, in a fine and three-dimensional manner, from being overlapped with each other, and therefore a space factor of the coil end portions 20a and 20b is improved so that the coil end portions 20a and 20b occupy less space. Further, the coil end portions 20a and 20b are made shorter, and thus compact, which reduces a leakage reactance. Further, the wires are wound to include a full-pitch wave winding configuration except for at the sheet end portion in the moving direction of the magnetic pole 61 of the movable element 60, where the coil side portions 10a, 10b are re-connected to each other, and thus heights of the coil end portions at a full-pitch winding portion may be uniform.

According to the first embodiment, the phase unit coils 5X1 and 5X2 are connected in parallel to each other, and thus a cross sectional area of the winding strand is halved compared to a case where the phase unit coils 5X1 and 5X2 are connected in series to each other. Accordingly, an eddy current loss occurring at the coil conductor portion is reduced. Further, a less force is needed to form the coil, and thus formability is enhanced and the coil is manufactured more easily, which enhances a working performance during, for example, assembly of the coil to the stator core 50. In the first embodiment, where the wires are connected to each other in Y-connection at a three-phase rotary electrical machine, the winding wires may be connected at four points, that is, at each of the phase terminals for the three phases and at the neutral point. Accordingly, end portion processing of the winding wire is performed easily and simply, which allows the end portions of the winding wire to be compact.

(2) Second Embodiment

In a second embodiment, a configuration of the end portion of the helically-wound sheet-shaped coil differs from that in the first embodiment. FIGS. 8A to 8D schematically illustrate a configuration of an end portion (a sheet-end routing) of a helically-wound sheet-shaped coil. The configurations of the end portions of the second embodiment illustrated in FIGS. 8A to 8D differ from those illustrated in FIGS. 6A to 6D in that the connecting points of the coil units 1a and 1b are not included at the sheet end portion in the right direction on the paper surface on which the FIGS. 8A to 8D are drawn. FIGS. 8A to 8D correspond to FIGS. 6A to 6D, respectively, and therefore the same reference numbers designate the same or corresponding portions and description of these portions is omitted. Further, in FIGS. 8A to 8D, the coil units 1a and 1b are illustrated in a solid line and a dotted line, respectively for convenience of the explanation, however, the coil units 1a and 1b are actually formed integrally with each other. The explanation will be made hereunder on the basis of FIG. 8A using the U phase as an example, which applies also to the V phase and W phase.

Figure 8A:
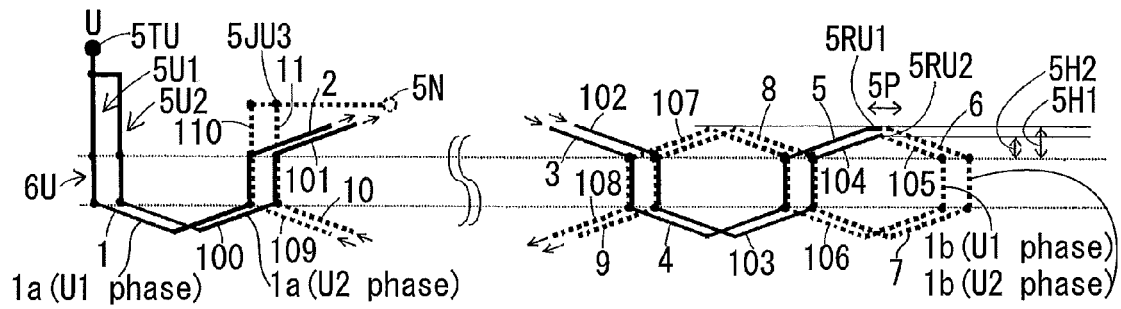
FIG. 8A schematically illustrates a configuration of an end portion (a sheet-end routing) of a U phase of a helically-wound sheet-shaped coil according to a second embodiment.
Figure 8B:
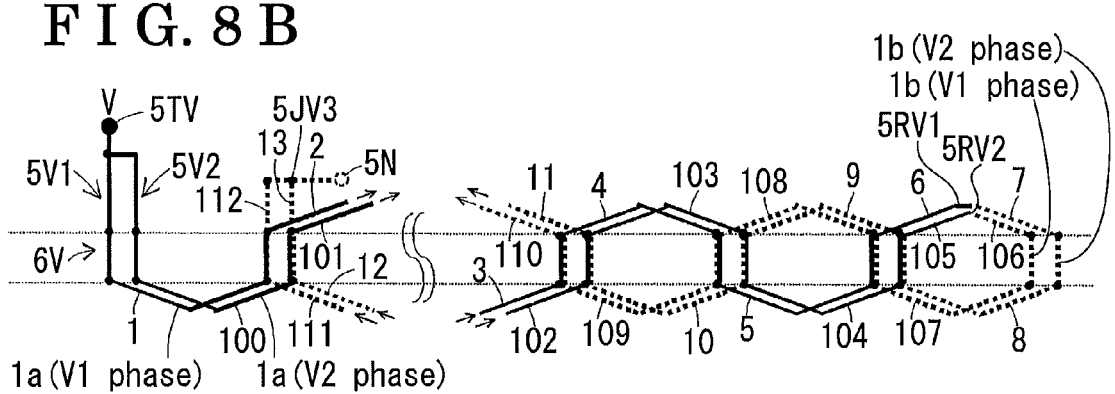
FIG. 8B schematically illustrates a configuration of an end portion (a sheet-end routing) of a V phase of the helically-wound sheet-shaped coil according to the second embodiment.
Figure 8C:
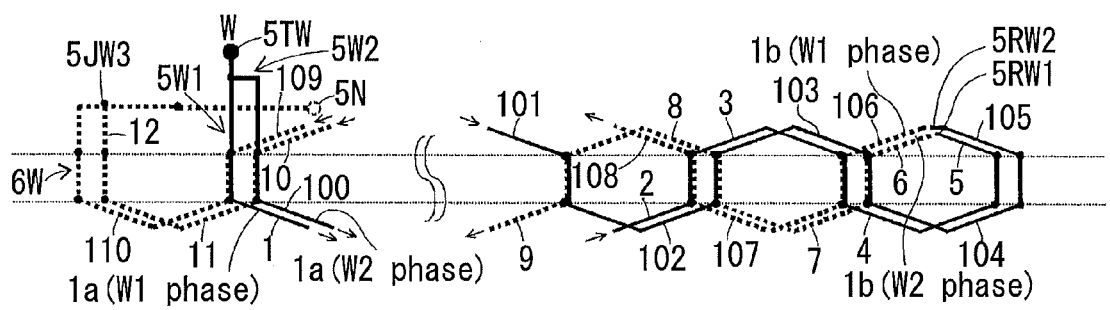
FIG. 8C schematically illustrates a configuration of an end portion (a sheet-end routing) of a W phase of the helically-wound sheet-shaped coil according to the second embodiment.
Figure 8D:
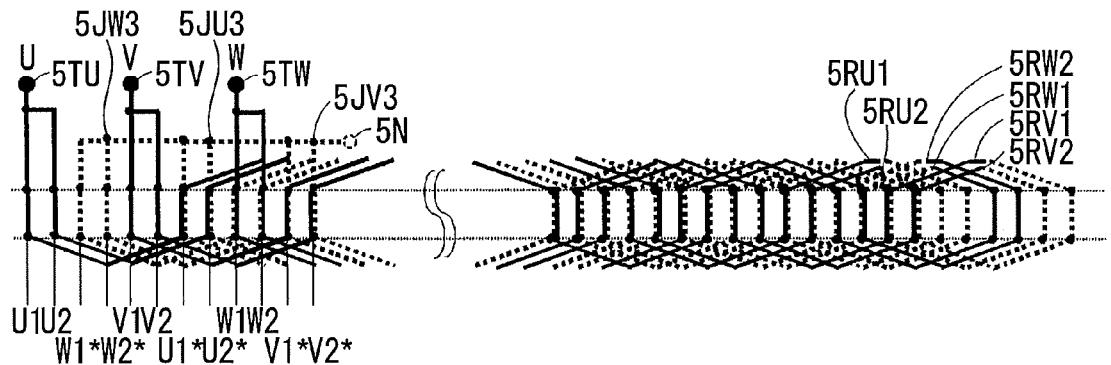
FIG. 8D schematically illustrates the configuration of the end portion (the sheet-end routing) of the U, V and W phases of the helically-wound sheet-shaped coil according to the second embodiment.

The phase unit coil 5U1 is wound starting at the U-phase terminal 5TU in the right direction on the paper surface on which FIG. 8A is drawn (corresponding to the coil unit 1a of the U1 phase, which is illustrated in the solid line, refer to the reference numbers 1 to 5) and then is wound back in the left direction on the paper surface at a coil routing point 5RU1 (corresponding to the coil unit 1b of the U2 phase, which is illustrated in the dotted line, refer to the reference numbers 6 to 11), and then is connected to the neutral point 5N. The phase unit coil 5U2 is wound starting at the U-phase terminal 5TU in the right direction on the paper surface (corresponding to the coil unit 1a of the U2 phase, which is illustrated in the solid line, refer to the reference numbers 100 to 104), wound back in the left direction on the paper surface at a coil routing point 5RU2 (corresponding to the coil unit 1b of the U1 phase which is illustrated in the dotted line, refer to the reference numbers 105 to 110), connected to the coil unit 1b of the U2 phase at the connecting point 5JU3, and then is connected to the neutral point 5N. The phase unit coil 5U1 and the phase unit coil 5U2 are connected to each other in parallel so as to form the phase coil 6U. Alternatively, the phase unit coil 5U1 may be routed to the neutral point 5N without performing the connecting processing at the connecting point 5JU3, so that the connecting processing for all of the three phases is performed at the neutral point 5N.

In the second embodiment, the sheet end portion in the right direction on the paper surface does not include the connecting point of the winding wires, and thus the sheet end portion is made more compact compared to the first embodiment where the coils are connected to each other at the sheet end portion. As illustrated in FIG. 8A, a coil end portion height 5H1 refers to a height from a slot accommodation portion of the stator core 50 to the coil routing point 5RU1 and a coil end portion height 5H2 refers to a height from the slot accommodation portion of the stator core 50 to the coil routing point 5RU2. Because the coil routing point 5RU2 is lower than the coil routing pint 5RU1, the winding wires of the same phase in a vicinity of the coil routing points 5RU1 and 5RU2 do not intersect with each other neither in the sheet thickness direction nor in a direction of the height of the coil end portions. Accordingly, the coil end portion at which the coil side portions are re-connected may be made compact. Further, the winding wires in a vicinity of the coil routing points 5RU1 and 5RU2 are arranged to be substantially parallel to a direction of an arrow 5P illustrated in FIG. 8A, which corresponds to the moving direction of the magnetic pole 61 of the movable element 60, and to be offset relative to each other in a direction of the coil side portion. Thus, the height of the coil end portion in the direction of the coil side portion are set to be substantially identical between the coil end portions at which the coil side portions are re-connected and the coil end portions at which the re-connection is not performed. Consequently, the height of the coil end portions in the direction of the coil side portion is uniform.

(3) Third Embodiment

Figure 9A:
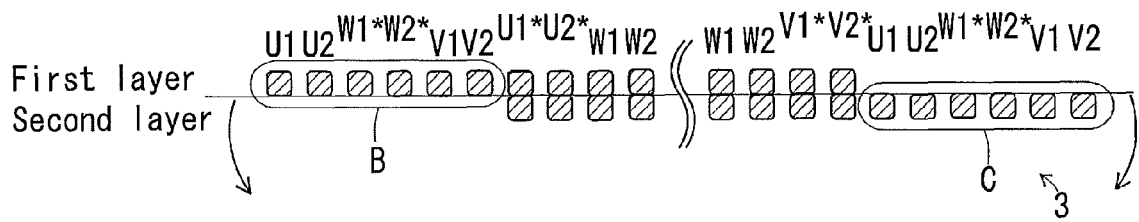
FIG. 9A is a cross-sectional view of coil side portions of a helically-wound sheet-shaped coil including a concentric cylindrical shape according to a third embodiment, in a state where the helically-wound sheet-shaped coil is developed in a planar state.
Figure 9B:
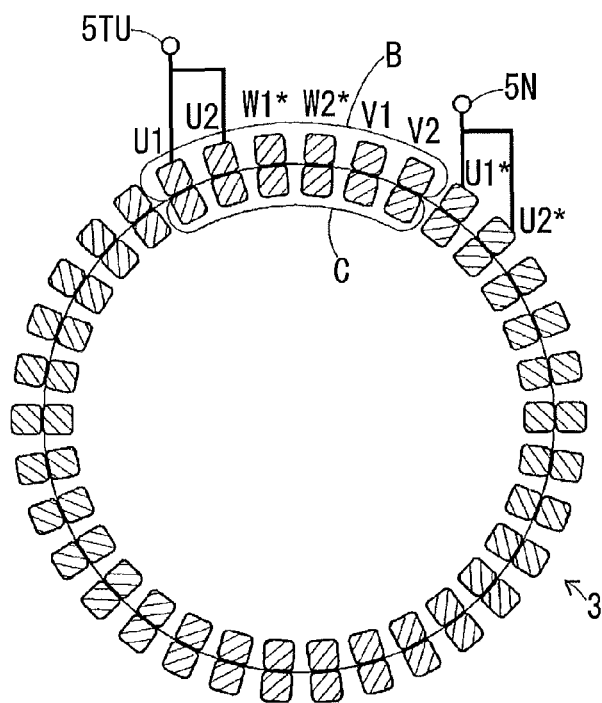
FIG. 9B is a cross-sectional view of the coil side portions of the helically-wound sheet-shaped coil including the concentric cylindrical shape according to the third embodiment.

A helically-wound sheet-shaped coil according to a third embodiment differs from those of the first embodiment and the second embodiment in that end portions, in the moving direction of the magnetic pole 61 of the movable element 60, of the helically-wound sheet-shaped coil are overlapped with each other so as to form a concentric cylindrical shape. FIGS. 9A and 9B are cross-sectional views of the coil side portion of the helically-wound sheet-shaped coil including the concentric cylindrical shape according to the third embodiment. FIG. 9A illustrates the end portions of the helically-wound sheet-shaped coil that is not formed in the concentric cylindrical shape, that is, in a state where the helically-wound sheet-shaped coil is developed in a planar state. FIG. 9B illustrates the end portions of the helically-wound sheet-shaped coil formed in the concentric cylindrical shape. At one of the end portions of the helically-wound sheet-shaped coil 3, the coil side portions for six winding pitches which are enclosed by a line defining an area B in FIG. 9A are provided only in the first layer. At the other one of the end portions of the helically-wound sheet-shaped coil, the coil side portions for six winding pitches which are enclosed by a line defining an area C in FIG. 9A are provided only in the second layer. By bringing the end portions of the helically-wound sheet-shaped coil 3 in directions of respective arrows illustrated in FIG. 9A, the helically-wound sheet-shaped coil 3 is formed to present the concentric cylindrical shape as illustrated in FIG. 9B.

For example, in FIG. 9A, starting at the coil side portion of the forward direction U1 in the area B, the winding wire is connected by means of the wave winding in an order of: the forward direction U1, the reverse direction U1 followed by an asterisk, the forward direction U1, the reverse direction U1 followed by an asterisk repetitively in a direction of the area C, and then is connected to the forward direction U2 of the area C. Then, the winding wire is connected in an order of: the forward direction U2, the reverse direction U2 followed by an asterisk, the forward direction U2, and the reverse direction U2 followed by an asterisk repetitively in a direction of the area B, and then is connected to the reverse direction U2 followed by an asterisk adjacent to the area B. Similarly, starting at the coil side portion of the forward direction U2 in the area B, the winding wire is connected by means of the wave winding in an order of: the forward direction U2, the reverse direction U2 followed by an asterisk, the forward direction U2, the reverse direction U2 followed by an asterisk repetitively in the direction of the area C, and then is connected to the forward direction U1 of the area C. Then, the winding wire is connected by means of the wave winding in an order of: the forward direction U1, the reverse direction U1 followed by an asterisk, the forward direction U1, and the reverse direction U1 followed by an asterisk repetitively in the direction of the area B, and then is connected to the reverse direction U1 followed by an asterisk which is adjacent to the area B. Next, in FIG. 9B, the phase terminal 5TU is connected to the coil side portion of the forward direction U1 and to the coil side portion of the forward direction U2 which are enclosed by the line defining the area B. The neutral point 5N is connected to the coil side portion of the reverse direction U1 followed by an asterisk which is adjacent to the area B, and to the coil side portion of the reverse direction U2 followed by an asterisk which is adjacent to the aforementioned coil side portion of the reverse direction U1 to which the neutral point 5N is connected.

Thus, similarly to the first and second embodiments, the inner circulating current is prevented from occurring according to the third embodiment. Plural of the helically-wound sheet-shaped coil 3 may be arranged to form the concentric cylindrical shape. In this case, the phase terminals of each of the helically-wound sheet-shaped coil 3 are serially or parallelly connected to each other for each phase, and the neutral points are held together.

(4) Fourth Embodiment

The detailed descriptions were provided regarding the helically-wound sheet-shaped coil, however, this disclosure is not limited to the helically-wound sheet-shaped coil and is widely applicable to a rotary electrical machine including the wave winding configuration. For a convenience of explanation, the descriptions were provided regarding the case where two kinds of the coil side portions are provided at each magnetic pole of each phase, and the two of the phase unit coils are parallelly connected to each other. However, this disclosure is applicable to a rotary electrical machine where the number of the kinds of the coil side portions provided at each magnetic pole of each phase is different from that in the above-described case, and the number of the phase unit coils that are parallelly connected to each other is different from that in the above-described case. First, the rotary electrical machine of a fourth embodiment, where three kinds of coil side portions are provided at each magnetic pole of each phase, and three of the phase unit coils are parallelly connected to each other, will be described hereunder. Then, generalized descriptions will be provided in the following section.

Each of FIGS. 10A and 10B is a view developed in a circumferential direction of a rotary electrical machine including three kinds of coil side portions at each magnetic pole of each phase according to the fourth embodiment, which illustrates an example of a connection status of U-phase coils of the rotary electrical machine. As illustrated in FIGS. 10A and 10B, the coil side portions of the three-phase rotary electrical machine including six poles are arranged in an order of: the U phase (the forward direction U1), the U phase (the forward direction U2), the U phase (the forward direction U3), the W phase (the reverse direction W1 followed by an asterisk), the W phase (the reverse direction W2 followed by an asterisk), the W phase (the reverse direction W3 followed by an asterisk), the V phase (the forward direction V1), the V phase (the forward direction V2) and the V phase (the forward direction V3) in the moving direction of the magnetic pole 61 of the movable element 60. Thus, a total number of the kinds of the coil side portions of the U phase refers to eighteen (=3×6 poles). The explanation will be made hereunder by using the U phase as an example, which applies also to the V phase and W phase.

The three kinds of the coil side portions for the U phase, which are arranged adjacent to each other, are serially connected to each other at the respective coil end portions (the coil end portions are positioned at the same side in the direction of the coil side portion) thereof so that each of the three kinds of the coil side portions includes the wave winding configuration, thereby forming the phase unit coils 5U1, 5U2 and 5U3. The phase unit coils 5U1, 5U2 and 5U3 are parallelly connected to each other, one side of each of the phase unit coils 5U1, 5U2 and 5U3 is connected to the phase terminal 5TU, and the other side of each of the phase unit coils 5U1, 5U2 and 5U3 is connected to the neutral pint 5N. In FIGS. 10A and 10B, the phase unit coil 5U1 is indicated in a bold solid line, the phase unit coil 5U2 is indicated in a dotted line, and the phase unit coil 5U3 is indicated in a thin solid line. In FIGS. 10A and 10B, the reference numbers indicate a connection order of the winding wire from the U-phase terminal 5TU to the neutral point 5N. Because the phase unit coils 5U1, 5U2 and 5U3 are parallelly connected to each other, the connection order of the winding wire of the phase unit coil 5U1 which starts at the U-phase terminal 5TU is indicated with reference numbers starting with 10, the connection order of the winding wire of the phase unit coil 5U2 which starts at the U-phase terminal 5TU is indicated with reference numbers starting with 20, and the connection order of the winding wire of the phase unit coil 5U3 which starts at the U-phase terminal 5TU is indicated with reference numbers starting with 30, for convenience of the explanation in FIGS. 10A and 10B.

FIG. 10A illustrates an example of the connection status where the phase unit coil does not include the full-pitch winding portion. The coil end portions of the phase unit coil 5U1 include a one-long-pitch winding portion (refer to the reference number 10), the one-long-pitch winding portion (refer to the reference number 11), a two-short-pitch winding portion (refer to the reference number 12), the one-long-pitch winding portion (refer to the reference number 13), the one-long-pitch winding portion (refer to the reference number 14) and the two-short-pitch winding portion (refer to the reference number 15). The six coil side portions of the phase unit coil 5U1 are serially connected to each other in this order at the respective coil end portions. The coil end portions of the phase unit coil 5U2 include the one-long-pitch winding portion (refer to the reference number 20), the two-short-pitch winding portion (refer to the reference number 21), the one-long-pitch winding portion (refer to the reference number 22), the one-long-pitch winding portion (refer to the reference number 23), the two-short-pitch winding portion (refer to the reference number 24) and the one-long-pitch winding portion (refer to the reference number 25). The six coil side portions of the phase unit coil 5U2 are serially connected to each other in this order at the respective coil end portions. The coil end portions of the phase unit coil 5U3 include the two-short-pitch winding portion (refer to the reference number 30), the one-long-pitch winding portion (refer to the reference number 31), the one-long-pitch winding portion (refer to the reference number 32), the two-short-pitch winding portion (refer to the reference number 33), the one-long-pitch winding portion (refer to the reference number 34) and the one-long-pitch winding portion (refer to the reference number 35). The six coil side portions of the phase unit coil 5U3 are serially connected to each other in this order at the respective coil end portions. The connection from reference number 15 to the reference number 10, the connection from reference number 25 to the reference number 20 and the connection from the reference number 35 to the reference number 30, are repeated for plural times depending on a required number of winding at one phase. Here, "full-pitch winding portion" refers to the wire winding portion where a distance between the coil side portions serially connected to each other corresponds to one pole pitch (nine winding pitches in the embodiment). The "one-long-pitch winding portion" refers to the wire winding portion where the distance between the coil side portions serially connected to each other is longer than one pole pitch by one winding pitch. In a similar manner thereto, the "two-short-pitch winding portion" refers to the wire winding portion where the distance between the coil side portions serially connected to each other is shorter than one pole pitch by two winding pitches.

For example, it is assumed that six of the coil side portions of the U1 phase are selected and the phase unit coil 5U1 is constituted by the selected six coil side portions, six of the coil side portions of the U2 phase are selected and the phase unit coil 5U2 is constituted by the selected six coil side portions, and six of the coil side portions of the U3 phase are selected and the phase unit coil 5U3 is constituted by the selected six coil side portions. The coil side portions of the U1 phase, the coil side portions of the U2 phase and the coil side portions of the U3 phase are arranged apart from each other by one winding pitch in the moving direction of the magnetic pole 61 of the movable element 60, and therefore the phases thereof are, precisely speaking, different from each other even though the phase unit coils 5U1, 5U2 and 5U3 are in the same phase (the U phase). Accordingly, in a case where the phase unit coil 5U1 is constituted only by the coil side portions of the U1 phase, the phase unit coil 5U2 is constituted only by the coil side portions of the U2 phase, and the phase unit coil 5U3 is constituted only by the coil side portions of the U3 phase, the induced voltages generated at the respective phase unit coils 5U1, 5U2 and 5U3 are different from each other, and therefore, the circulating current occurs in the U phase when the phase unit coils 5U1, 5U2 and 5U3 are parallelly connected to each other.

According to the fourth embodiment, in the phase unit coil 5U1, the six coil side portions are serially connected to each other at the above-described coil end portions (refer to the reference numbers 10 to 15), and thus the coil side portions are selected in an order of: the U1 phase, the U2 phase, the U3 phase, the U1 phase, the U2 phase and the U3 phase. Accordingly, the phase unit coil 5U1 includes two of the coil side portions of the U1 phase, two of the coil side portions of the U2 phase and two of the coil side portions of the U3 phase. In a similar manner thereto, each of the phase unit coils 5U2 and 5U3 includes two each of the coil side portions of the U1, U2 and U3 phases. Consequently, the induced voltages generated at the phase unit coils 5U1, 5U2 and 5U3 are equal to each other. Therefore, the circulating current is not generated in the U phase even in a case where the phase unit coils 5U1, 5U2 and 5U3 are parallelly connected to each other, and thus the output of the rotary electrical machine is maintained without being decreased due to the circulating current in the phase.

Further, the three-phase rotary electrical machine illustrated in FIG. 10A includes the wave winding configuration having the stator-circumference-multiple, in a similar manner to the first embodiment, even in a case where, for example, the field flux includes the variations due to the eccentricity of the rotor and the like, variations is unlikely to occur between the induced voltages generated at the respective phase coils. Accordingly, the output of the rotary electrical machine is maintained without being decreased due to the inner circulating current between the phases. The stator-circumference-multiple refers to that the circumferential length of the phase unit coil is the natural-number multiple of the circumferential length of the stator. The circumferential length of the phase unit coil includes the number of the coil side portions serially connected to each other at each of the phase unit coils (a number k of the serially-connected coil side portions), and the circumferential length of the stator includes a number 2p of the magnetic poles. In the fourth embodiment, the number k of the serially-connected coil side portions refers to six and the number 2p of the magnetic poles refers to six.

FIG. 10B illustrates an example of the connection status where the full-pitch winding portion is included in part of the phase unit coil. The coil end portions of the phase unit coil 5U1 include the full-pitch winding portion (refer to the reference number 10), the one-long-pitch winding portion (refer to the reference number 11), the full-pitch winding portion (refer to the reference number 12), the one-long-pitch winding portion (refer to the reference number 13), the full-pitch winding portion (refer to the reference number 14) and the two-short-pitch winding portion (refer to the reference number 15). The six coil side portions of the phase unit coil 5U1 are serially connected to each other in this order at the respective coil end portions. The coil end portions of the phase unit coil 5U2 include the full-pitch winding portion (refer to the reference number 20), the one-long-pitch winding portion (refer to the reference number 21), the full-pitch winding portion (refer to the reference number 22), the two-short-pitch winding portion (refer to the reference number 23), the full-pitch winding portion (refer to the reference number 24) and the one-long-pitch winding portion (refer to the reference number 25). The six coil side portions of the phase unit coil 5U2 are serially connected to each other in this order at the respective coil end portions. The coil end portions of the phase unit coil 5U3 include the full-pitch winding portion (refer to the reference number 30), the two-short-pitch winding portion (refer to the reference number 31), the full-pitch winding portion (refer to the reference number 32), the one-long-pitch winding portion (refer to the reference number 33), the full-pitch winding portion (refer to the reference number 34) and the one-long-pitch winding portion (refer to the reference number 35). The six coil side portions of the phase unit coil 5U3 are serially connected to each other in this order at the respective coil end portions.

According to the rotary electrical machine illustrated in FIG. 10B, each of the phase unit coils 5U1, 5U2 and 5U3 includes two each of the coil side portions of the U1, U2 and U3 phases in a similar manner to the rotary electrical machine illustrated in FIG. 10A. Consequently, the induced voltages generated at the phase unit coils 5U1, 5U2 and 5U3 are equal to each other. Therefore, the circulating current is not generated in the U phase even in a case where the phase unit coils 5U1, 5U2 and 5U3 are parallelly connected to each other, and thus the output of the rotary electrical machine is maintained without being decreased due to the circulating current in the phase. Further, because the rotary electric machine illustrated in FIG. 10B includes the wave winding configuration having the stator-circumference-multiple, the output of the rotary electrical machine is maintained without being decreased due to the inner circulating current between the phases in a similar manner to the rotary electrical machine illustrated in FIG. 10A.

(5) Generalized Descriptions

Figure 11:
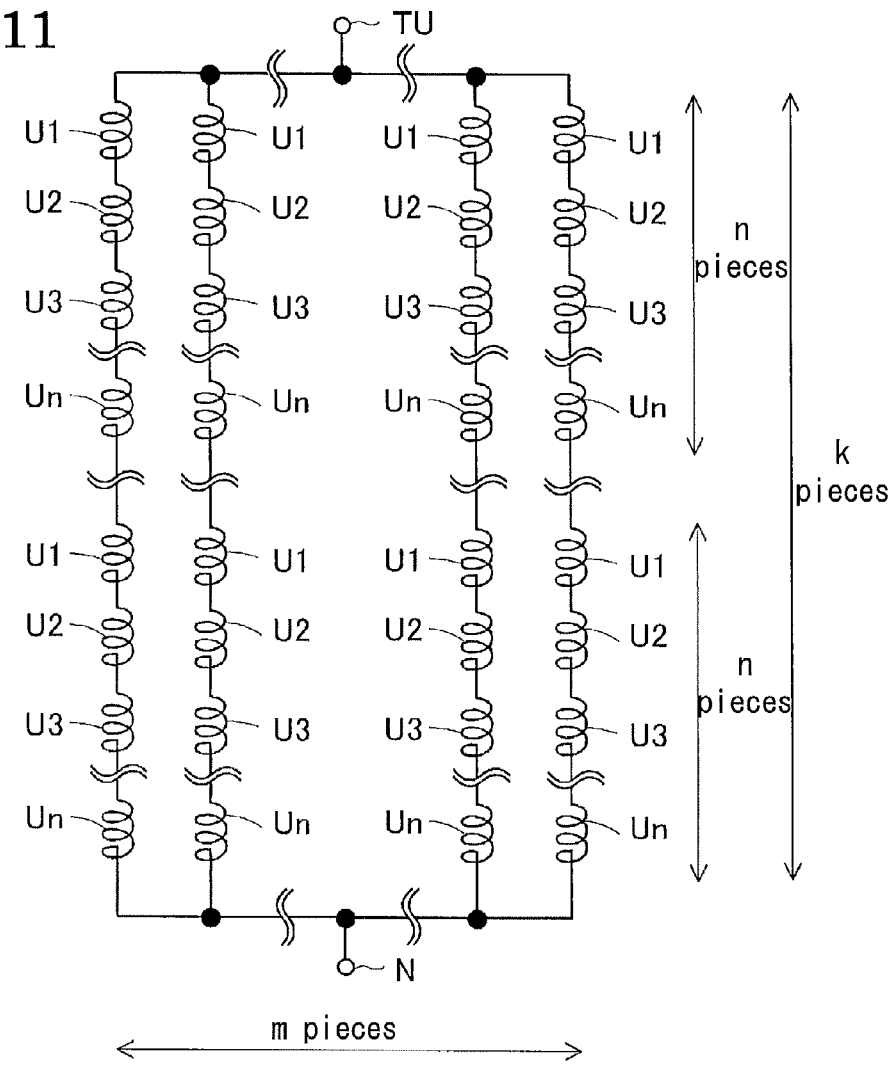
FIG. 11 schematically illustrates an example of a phase configuration of U phase of a rotary electrical machine including n kinds of coil side portions at each magnetic pole of each phase.
Figure 12:
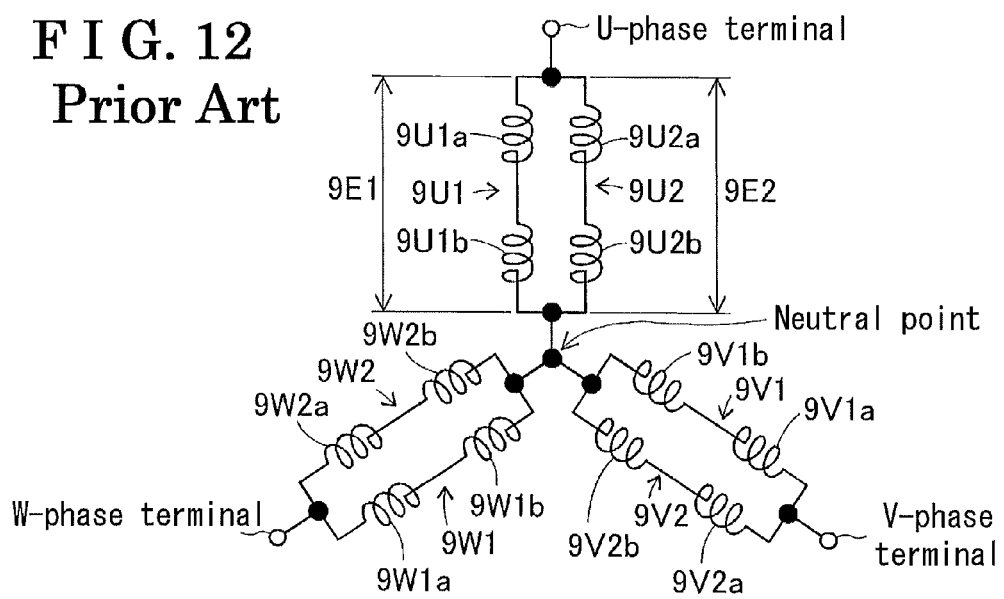
FIG. 12 schematically illustrates a known phase configuration of a rotary electrical machine including two kinds of coil sides at each magnetic pole of each phase.
Figure 13:
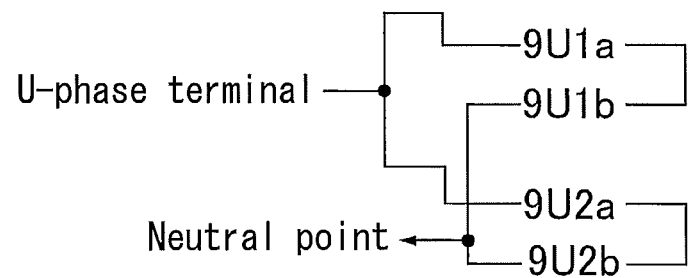
FIG. 13 schematically illustrates a known connection status of a U-phase coil of the rotary electrical machine of FIG. 12.
Figure 14:
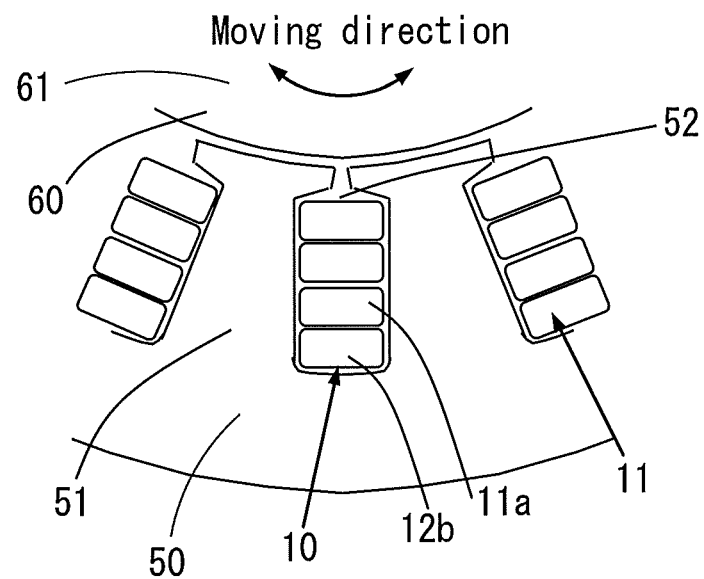
FIG. 14 schematically illustrates a state where the coils are arranged at respective slots of the stator core according to the embodiments disclosed here.

According to the wave winding coil for the rotary electrical machine of the embodiments, one coil side portion is selected at each of the magnetic poles from among n kinds of the coil side portions which are arranged at each of the magnetic poles of each of the phases, the n kinds of the coil side portions are in the same phase and includes different electromagnetic phase from each other, n refers to a natural number, the coil side portions selected for a required number of the magnetic poles are serially connected to each other at the coil end portion of the coil side portions for forming the phase unit coil, plural phase unit coils are parallelly connected to each other for forming the phase coil, each of the plural phase unit coils includes the selected coil side portions that are different from each other. FIG. 11 schematically illustrates an example of the phase configuration of the U phase of the rotary electrical machine including n kinds of coil side portions at each magnetic pole of each phase. The number of the magnetic poles refers to 2p and the number of the phase unit coils parallelly connected to each other refers to m. The number of the serially-connected coil side portions in each of the phase unit coils refers to the number k of the serially-connected coil side portions.

As illustrated in FIG. 11, each of the phase unit coils is constituted by the coil side portions of n kinds (from the U1 phase to a Un phase) of the U phase which are serially connected to each other and of which phases are electromagnetically different from each other. Each of the phase unit coils includes k pieces of the coil side portions and m pieces of the phase unit coils are parallelly connected to each other. In FIG. 11, a reference character TU designates the U-phase terminal and the reference character N designates the neutral point. A connection order of the coil side portions that are serially connected to each other is not limited to the order illustrated in FIG. 11. Here, a number q of serially-connected-conductors per magnetic pole, the conductors belonging to one of the kinds of the coil side portion, refers to one. In a case where the number q of the serially-connected-conductors per magnetic pole, the conductors belonging to one of the kinds of the coil side portion, is plural, the phase unit coils illustrated in FIG. 11 may be serially connected to each other for as many as the number q of the serially-connected-conductors per magnetic pole, the conductors belonging to one of the kinds of the coil side portion, and may be treated as the phase unit coil.

According to the embodiments, each of the phase unit coil of the phase coil includes all of the n kinds of the coil side portions in a manner that an identical number of each of the n kinds of coil side portion is included in each of the phase unit coil, the coil side portions are selected in a manner that the number of the coil side portions serially connected to each other is identical to each other between the phase unit coils, and a relational expression expressing a total number of the coil side portions included in the phase coil is expressed by a mathematical expression 1 as follows.

$$m \times k = n \times q \times 2p. \qquad \text{(Mathematical expression 1)}$$

In order to prevent the circulating current in the phase from occurring, each of the phase unit coils that are parallelly connected to each other needs to include all kinds of the coil side portions from among the n kinds in a manner that the number of each of the n kinds is identical to each other between the phase unit coils, and at the same time, the number of the coil side portions that are serially connected each other needs to be identical to each other. In other words, the number k of the serially-connected coil side portions needs to be the natural-number multiple of n. Consequently, the number k of the serially-connected coil side portions is expressed by a mathematical expression 2 as follows by using a natural number g.

$$k = g \times n \qquad \text{(Mathematical expression 2)}$$

Further, there needs to be substantially no variation between the induced voltages generated at the respective phase coils even in a case where the field flux includes the variations due to, for example, the eccentricity of the rotor. In a case where the variation occurs in the field flux, each of the phase coils includes a coil portion where the induced voltage is relatively high and a coil portion where the induced voltage is relatively low along the circumference of the stator. Thus, by setting the circumferential length of the phase unit coil at the natural-number multiple of the circumferential length of the stator, the induced voltages are made to be uniform along the circumference of the stator. The number of the serially-connected coil side portions which are included in the circumferential length of the phase unit coil refers to k, and the number of the magnetic poles included in the circumferential length of the stator refers to 2p. Consequently, a relation between k and 2p is expressed by a mathematical expression 3 as follows by using a natural number h. Further, in a case where the phase unit coils are serially connected to each other for as many as the number q of the serially-connected-conductors per magnetic pole, the conductors belonging to one of the kinds of the coil side portion, the number k of the serially-connected coil side portions is expressed by a mathematical expression 4 as follows by using a natural number z. The relational expression expressed by the mathematical expression 3 is expressed by the relational expression expressed by the mathematical expression 4.

$$k = h \times 2p \quad \text{(Mathematical expression 3)}$$

$$k = z \times 2p \times q \quad \text{(Mathematical expression 4)}$$

The product of the number m of the phase unit coils that are parallelly connected to each other and the number k of the serially-connected coil side portions refers to a total number of the coil side portions per phase, and thus the total number of the coil side portions per phase is expressed by the above-described mathematical expression 1. By substituting the mathematical expression 2 into the mathematical expression 1, m is expressed by a mathematical expression 5 as follows. Further, by substituting the mathematical expression 4 into the mathematical expression 1, m is expressed by a mathematical expression 6 as follows. From the mathematical expressions 5 and 6, m needs to be a common divisor between q×2p and n.

$$m = q \times 2p / g \quad \text{(Mathematical expression 5)}$$

$$m = n / z \quad \text{(Mathematical expression 6)}$$

Relative to the number n of the kinds of the coil side portions provided at each magnetic pole of each phase and relative to the number 2p of the magnetic poles, example combinations of m and k, which are calculated on the basis of the relational expression indicated in the mathematical expression 1 in a case where q=1, are shown in Table 1. Example combinations of m and k, which are calculated on the basis of the relational expression indicated in the mathematical expression 1 in a case where q=4, are shown in Table 2. In Tables 1 and 2, each of the combinations of the number m (the number of the phase unit coils parallelly connected to each other) and the number k (the number of the coil side portions serially connected to each other) is shown within a pair of parentheses in a manner that m and k are separated from each other by comma. The number positioned on the left within each pair of parentheses refers to the number m and the number positioned on the right within each pair of parentheses refers to the number k. The embodiments are, however, not limited to the combinations shown in Table 1 and 2, and are applicable to a case where the number n of the kinds of the coil side portions at each magnetic pole of each phase is equal to or greater than four, and a case where the number 2p of the magnetic poles is equal to or greater than ten. Further, the number q of the serially-connected-conductors is not limited to one and four.

TABLE 1

| Number n of kinds of coil side portion at each magnetic pole of each phase | Number 2p of magnetic poles | | | |
|---|---|---|---|---|
| | 2 (p = 1) | 4 (p = 2) | 6 (p = 3) | 8 (p = 4) |
| 2 | (2, 2) | (2, 4) | (2, 6) | (2, 8) |
| 3 | None | None | (3, 6) | None |

TABLE 2

| Number n of kinds of coil side portion at each magnetic pole of each phase | Number 2p of magnetic poles | | | |
|---|---|---|---|---|
| | 2 (p = 1) | 4 (p = 2) | 6 (p = 3) | 8 (p = 4) |
| 2 | (2, 8) | (2, 16) | (2, 24) | (2, 32) |
| 3 | None | None | (3, 24) | None |

According to the embodiments, each of the phase unit coil parallelly connected to each other includes all of the n kinds of the coil side portions in a manner that the identical number of each of the n kinds of coil side portion is included in each of the phase unit coil, the coil side portions are selected in a manner that the number of the coil side portions serially connected to each other is identical to each other between the phase unit coils, the relational expression expressing the total number of the coil side portions included in the phase coil is expressed by the mathematical expression 1. Accordingly, the induced voltages generated at respective phase unit coils parallelly connected to each other are equal to each other. Thus, the circulating current in the phase does not occur, and therefore the output of the rotary electrical machine is not decreased by the circulating current in the phase and the output of the rotary electrical machine is maintained. Further, the embodiments include the wave winding configuration having the stator-circumference-multiple, that is, the circumferential length of the phase unit coil (the number of the serially-connected coil side portions included refers to k) is the natural-number multiple of the circumferential length of the stator (the number of the magnetic poles included refers to 2p). Thus, even in a case where the field flux includes the variations due to, for example, the eccentricity of the rotor and the like, the variations are unlikely to occur at the induced voltages generated between the phase coils. Accordingly, the output of the rotary electrical machine is not decreased by the inner circulating current between the phases and the output of the rotary electrical machine is maintained.

According to the embodiments, the phase unit coils are connected in parallel to each other, and thus the cross sectional area of the winding strand is halved compared to the case where the phase unit coils are connected in series to each other. Accordingly, the eddy current loss occurring at the coil conductor portion is reduced. Further, the less force is needed to form the coil, and thus the formability is enhanced and the coil is manufactured more easily, which enhances the working performance during, for example, the assembly of the coil to the stator core. In the embodiments, where the wires are connected to each other in Y-connection at the three-phase rotary electrical machine, the winding wires may be connected at the four points, that is, at each of the phase terminals for the three phases and at the neutral point. Accordingly, the end portions of the winding wires are processed easily and simply, which allows the end portions of the winding wire to be compact.

According to the embodiments, the number k of the serially-connected coil side portions is obtained by multiplying the number 2p of the magnetic poles by the natural number h as shown in the mathematical expression 3. Thus, the end portions of the winding wire of the respective phase unit coils that are parallelly connected to each other are arranged in the vicinity of each other. Accordingly, a length of a connecting wire for parallelly connecting the phase unit coils to each other is short, which facilitates the routing of the wire. Further, because the number k of the serially-connected coil side portions is an even number, the end portions of the winding wire of the phase unit coil are arranged at a same side of the slot accommodation portion in the axial direction. Accordingly, there is no need to rotate the stator in order to route the connecting wire, and thus an operation process is reduced.

According to the embodiments, it is desirable that each of the parallelly-connected phase unit coils includes the n kinds of the coil side portions which are serially connected to each other by kind and are arranged in the moving direction of the magnetic pole of the movable element. The portion, at which the coil side portions of the same kind are serially connected to each other, refers to the full-pitch winding portion. Thus, at the portion at which the coil side portions of the same kind are serially connected to each other, a positional relationship between the coil side portions relative to each other in the moving direction of the magnetic pole of the movable element is maintained. Accordingly, the configuration of the coil end portions and/or the height of the coil end portions in the direction of the coil side portion are uniform.

(6) Others

This disclosure is not limited to the aforementioned embodiments illustrated in the drawings, however, may be appropriately changed or modified for implementation without departing from the scope of the disclosure. Further, this disclosure may be used for various rotary electrical machines including the wave winding configuration. For example, this disclosure is applicable to an electric motor for a vehicle, an electric motor used in a household electrical appliance, or an electric motor driving general industrial machinery.

According to the aforementioned embodiments, the wave winding coil for the rotary electrical machine includes the coil units $1a$, $1b$ including the coil side portions $10a$, $10b$ and the coil end portions $20a$, $20b$, each of the coil side portion $10a$, $10b$ is configured to be provided by insertion at each slot $52$ of the stator core $50$ and to be positioned in the slot $52$ in the alternating manner, each of the coil end portion $20a$, $20b$ is formed integrally with the coil side portion $10a$, $10b$ and connecting the end portions of the coil side portions $10a$, $10b$ to each other, the end portions of the side portions $10a$, $10b$ are located at the identical side in the direction of the coil side portion $10a$, $10b$, the coil units $1a$, $1b$ is wound to include the wave winding configuration, wherein one coil side portion $10a$, $10b$ is selected at each of the magnetic poles $51$ from among the n kinds of coil side portions $10a$, $10b$ which are arranged at each of the magnetic poles $51$ of each of the phases U, V, W, the n kinds of coil side portions $10a$, $10b$ are in the same phase U, V, W and includes the different electromagnetic phase from each other, n refers to the natural number, the coil side portions $10a$, $10b$ selected for the required number of the magnetic poles $51$ are serially connected to each other at the coil end portions $20a$, $20b$ of the coil side portions $10a$, $10b$ for forming the phase unit coil $5X1$, $5X2$, the plural phase unit coils $5X1$, $5X2$ are parallelly connected to each other for forming the phase coil $6X$, each of the plural phase unit coils $5X1$, $5X2$ includes the selected coil side portions $10a$, $10b$ that are different from each other, each of the phase unit coils $5X1$, $5X2$ of the phase coil $6X$ includes all of the n kinds in a manner that the identical number of each of the n kinds of coil side portion $10a$, $10b$ is included in each of the phase unit coil $5X1$, $5X2$, the coil side portions $10a$, $10b$ are selected in a manner that the number of the coil side portions $10a$, $10b$ serially connected to each other is identical to each other among the plural phase unit coils $5X1$, $5X2$, the relational expression expressing the total number of the coil side portions $10a$, $10b$ included in the phase coil $6X$ is expressed by the mathematical expression 1, the mathematical expression 1 refers to m×k=n×q×2p, and m refers to the number of the phase unit coils $5X1$, $5X2$ that are parallelly connected to each other, k refers to the number of the coil side portions $10a$, $10b$ that are serially connected to each other, q refers to the number of the serially-connected-conductors per magnetic pole $51$, the serially-connected-conductor belongs to one of the kinds of the coil side portions, 2p refers to the number of the magnetic poles $51$, m refers to a common divisor between q×2p and n.

According to the above described structure, each of the phase unit coils $5X1$, $5X2$ of the phase unit $6X$ includes all of the n kinds in a manner that the identical number of each of the n kinds of coil side portion $10a$, $10b$ is included in each of the phase unit coil $5X1$, $5X2$, the coil side portions $10a$, $10b$ are selected in a manner that the number of the coil side portions $10a$, $10b$ serially connected to each other is identical to each other among the plural phase unit coils $5X1$, $5X2$, the relational expression expressing the total number of the coil side portions $10a$, $10b$ included in the phase coil $6X$ is expressed by the mathematical expression 1, the mathematical expression 1 refers to m×k=n×q×2p. Accordingly, the induced voltages generated at the respective phase unit coils $5X1$, $5X2$ parallelly connected to each other are equal to each other. Thus, the circulating current in the phase U, V, W does not occur, and therefore the output of the rotary electrical machine is not decreased by the circulating current in the phase U, V, W and the output of the rotary electrical machine is maintained. Further, the above described structure includes the wave winding configuration having the stator-circumference-multiple, that is, the circumferential length of the phase unit coil $5X1$, $5X2$ (the number of the serially-connected coil side portions $10a$, $10b$ included refers to k) is the natural-number multiple of the circumferential length of the stator (the number of the magnetic poles $51$ included refers to 2p). Thus, even in a case where the variations occur in the field flux due to, for example, the eccentricity of the rotor, the variations are unlikely to occur at the induced voltages generated between the phase coils $6X$. Accordingly, the output of the rotary electrical machine is not decreased by the inner circulating current between the phases U, V, W and the output of the rotary electrical machine is maintained.

According to the above described structure, the phase unit coils $5X1$ and $5X2$ are connected in parallel to each other, and thus the cross sectional area of the winding strand is halved compared to a case where the phase unit coils $5X1$ and $5X2$ are connected in series to each other. Accordingly, the eddy current loss occurring at the coil conductor portion is reduced. Further, the less force is needed to form the coil, and thus the formability is enhanced and the coil is manufactured more easily, which enhances the working performance during, for example, the assembly of the coil to the stator core $50$. According to the above described structure, in a case where the wires are connected to each other in Y-connection at the three-phase rotary electrical machine, the winding wires may be connected at the four points, that is, at each of the phase terminals 5TX for the three phases and at the neutral point 5N. Accordingly, the end portion processing of the winding wire is performed easily and simply, which allows the end portions of the winding wire to be compact.

According to the aforementioned embodiments, the phase unit coil 5X1, 5X2 includes the n kinds of the coil side portions 10a, 10b serially connected to each other by kind and arranged in the moving direction of a magnetic pole 61 of the movable element 60.

According to the above described structure, the phase unit coil 5X1, 5X2 includes the n kinds of the coil side portions 10a, 10b serially connected to each other by kind and arranged in the moving direction of a magnetic pole 61 of the movable element 60. Thus, the portion, at which the coil side portions 10a, 10b of the same kind are serially connected to each other, refers to the full-pitch winding portion. Accordingly, at the portion at which the coil side portions 10a, 10b of the same kind are serially connected to each other, the positional relationship between the coil side portions 10a, 10b relative to each other in the moving direction of the magnetic pole 61 of the movable element 60 is maintained. Accordingly, the configuration of the coil end portions 20a, 20b and/or the height of the coil end portions 20a, 20b in the direction of the coil side portion 10a, 10b are uniform.

According to the aforementioned embodiments, the wave winding configuration is configured as the helically-wound sheet-shaped coil 3 in which the coil unit 1a, 1b is linked in the helical state, and one of the coil side portions 10a, 10b serially connected to each other is re-connected to another one of the coil side portions 10a, 10b serially connected to each other at the end portion of the helically-wound sheet-shaped coil 3 in the moving direction of the magnetic pole 61 of the movable element 60, the one of the coil side portions 10a, 10b and the another one of the coil side portions 10a, 10b are in the same phase U, V, W and include the different electromagnetic phase from each other.

According to the above described structure, the re-connection between the coil side portions 10a, 10b is performed at the end portions of the helically-wound sheet-shaped coil 3 in the moving direction of the magnetic pole 61 of the movable element 60, and therefore the coils are manufactured easily and the operation performance is enhanced.

According to the aforementioned embodiments, the coil end portions 20a, 20b which are in the same phase and at which the coil side portions 10a, 10b are re-connected are overlapped with each other in the direction orthogonal to the moving direction of the magnetic pole 61 of the movable element 60.

According to the above described structure, the coil end portions 20a, 20b in the same phase, whose coil side portions 10a, 10b are re-connected, are overlapped with each other in the direction orthogonal to the moving direction of the magnetic pole 61 of the movable element 60, and thus the coil end portions at which the coil side portions are re-connected are made compact.

According to the aforementioned embodiments, the coil end portions 20a, 20b which are in the same phase and at which the coil side portions 10a, 10b are re-connected are arranged to be substantially parallel to the moving direction of the magnetic pole 61 of the movable element 60 and to be offset relative to each other in the direction of the coil side portion 10a, 10b.

According to the above described structure, the coil end portions 20a, 20b which are in the same phase and at which the coil side portions 10a, 10b are re-connected are arranged to be substantially parallel to the moving direction of the magnetic pole 61 of the movable element 60 and to be offset relative to each other in the direction of the coil side portion 10a, 10b. Thus, the height of the coil end portion 10a, 10b in the direction of the coil side portion are set to be substantially identical between the coil end portions 10a, 10b at which the coil side portions are re-connected and the coil end portions 10a, 10b at which the re-connection is not performed.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A wave winding coil for a rotary electrical machine, comprising:

a coil conductor including coil side portions and coil end portions, each of the coil side portions being configured to be provided by insertion at each slot of a stator core and to be positioned in the slot in an alternating manner, each of the coil end portions being formed integrally with each of the coil side portions and connecting end portions of the coil side portions to each other, the end portions of the side portions being located at an identical side in a direction of the coil side portion, the coil conductor being wound to include a wave winding configuration, wherein one coil side portion is selected at each of magnetic poles from among n kinds of the coil side portions which are arranged at each of the magnetic poles of each phase, the n kinds of the coil side portions are in a same phase and includes different electromagnetic phase from each other, n refers to a natural number, the coil side portions selected for a required number of the magnetic poles are serially connected to each other at the coil end portions of the coil side portions for forming a phase unit coil, a plurality of the phase unit coils are parallelly connected to each other for forming a phase coil, each of the plurality of the phase unit coils includes the selected coil side portions that are different from each other, each of the phase unit coils of the phase coil includes all of the n kinds in a manner that an identical number of each of the n kinds of coil side portion is included in each of the phase unit coil, the coil side portions are selected in a manner that the number of the coil side portions serially connected to each other is identical to each other between the plurality of phase unit coils, a relational expression expressing a total number of the coil side portions included in the phase coil is expressed by a mathematical expression 1, the mathematical expression 1 refers to $m \times k = n \times q \times 2p$, and m refers to the number of the phase unit coils that are parallelly connected to each other, k refers to the number of the coil side portions that are serially connected to each other, q refers to the number of serially-connected-conductors per magnetic pole, the serially-connected-conductor belongs to one of the kinds of the coil side portions, 2p refers to the number of the magnetic poles, m refers to a common divisor between q×2p and n.

2. The wave winding coil for the rotary electrical machine according to claim 1, wherein the phase unit coil includes the n kinds of the coil side portions serially connected to each other by kind and arranged in a moving direction of a magnetic pole of a movable element.

3. The wave winding coil for the rotary electrical machine according to claim 1, wherein the wave winding configuration is configured as a helically-wound sheet-shaped coil in which the coil conductor is linked in a helical state, and one of the coil side portions serially connected to each other is re-connected to another one of the coil side portions serially connected to each other at an end portion of the helically-wound sheet-shaped coil in the moving direction of the magnetic pole of the movable element, the one of the coil side portions and the another one of the coil side portions are in the same phase and include the different electromagnetic phase from each other.

4. The wave winding coil for the rotary electrical machine according to claim 3, wherein the coil end portions which are in the same phase and at which the coil side portions are re-connected are overlapped with each other in a direction orthogonal to the moving direction of the magnetic pole of the movable element.

5. The wave winding coil for the rotary electrical machine according to claim 4, wherein the coil end portions which are in the same phase and at which the coil side portions are re-connected are arranged to be parallel to the moving direction of the magnetic pole of the movable element and to be offset relative to each other in the direction of the coil side portion.

* * * * *